United States Patent
Rosenberg et al.

(10) Patent No.: US 10,379,664 B2
(45) Date of Patent: *Aug. 13, 2019

(54) SYSTEMS AND METHODS FOR MANIPULATING A VIRTUAL ENVIRONMENT

(71) Applicant: Sensel Inc., Mountain View, CA (US)

(72) Inventors: Ilya Daniel Rosenberg, Mountain View, CA (US); John Aaron Zarraga, Mountain View, CA (US); Alexander Meagher Grau, Mountain View, CA (US); Charles Robert Watson, Mountain View, CA (US)

(73) Assignee: Sensel Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/827,411

(22) Filed: Nov. 30, 2017

(65) Prior Publication Data

US 2018/0095591 A1    Apr. 5, 2018

Related U.S. Application Data

(63) Continuation of application No. 15/224,003, filed on Jul. 29, 2016, now Pat. No. 9,864,461, and a
(Continued)

(51) Int. Cl.
*G06F 3/041* (2006.01)
*G06F 3/01* (2006.01)
(Continued)

(52) U.S. Cl.
CPC ............ *G06F 3/0416* (2013.01); *G06F 3/017* (2013.01); *G06F 3/0346* (2013.01); *G06F 3/045* (2013.01);
(Continued)

(58) Field of Classification Search
CPC .... G06F 3/0416; G06F 3/017; G06F 3/04883; G06F 3/0414; G06F 3/0346; G06F 3/045;
(Continued)

(56) References Cited

U.S. PATENT DOCUMENTS

| 6,714,213 | B1* | 3/2004 | Lithicum | G06T 17/00 |
| | | | | 715/701 |
| 2014/0071069 | A1* | 3/2014 | Anderson | A63F 13/06 |
| | | | | 345/173 |
| 2014/0104274 | A1* | 4/2014 | Hilliges | G06F 3/011 |
| | | | | 345/424 |

* cited by examiner

*Primary Examiner* — Premal R Patel
(74) *Attorney, Agent, or Firm* — Run8 Patent Group, LLC; Peter Miller

(57) ABSTRACT

One variation of a method for manipulating virtual objects within a virtual environment includes: determining a first position of a touch sensor within real space; based on the first position of the touch sensor within real space, bounding a virtual surface of a virtual object within the virtual environment tractable through inputs across the touch sensor; generating a first force vector comprising a magnitude related to a force magnitude of a first input on the touch sensor surface and a direction related to an orientation of the touch sensor within real space; locating an origin of the first force vector within the virtual environment based on a first location of the first input on the touch sensor surface and the first position of the touch sensor within real space; and manipulating the virtual surface of the virtual object within the virtual environment according to the first force vector.

20 Claims, 8 Drawing Sheets

Related U.S. Application Data continuation of application No. 15/223,968, filed on Jul. 29, 2016, now Pat. No. 9,864,460.

(60) Provisional application No. 62/198,222, filed on Jul. 29, 2015.

(51) Int. Cl.
  *G06F 3/0346* (2013.01)
  *G06T 19/00* (2011.01)
  *G06F 3/045* (2006.01)
  *G06F 3/0481* (2013.01)
  *G06F 3/0484* (2013.01)
  *G06F 3/0488* (2013.01)

(52) U.S. Cl.
  CPC ........ *G06F 3/0414* (2013.01); *G06F 3/04815* (2013.01); *G06F 3/04842* (2013.01); *G06F 3/04845* (2013.01); *G06F 3/04883* (2013.01); *G06T 19/006* (2013.01); *G06F 2203/04102* (2013.01); *G06F 2203/04104* (2013.01); *G06F 2203/04105* (2013.01)

(58) Field of Classification Search
  CPC ............. G06F 3/04842; G06F 3/04815; G06F 3/04845; G06F 2203/04105; G06F 2203/04102; G06F 2203/04104; G06T 19/006
  See application file for complete search history.

SYSTEMS AND METHODS FOR MANIPULATING A VIRTUAL ENVIRONMENT

CROSS-REFERENCE TO RELATED APPLICATIONS

This Application is a continuation application of U.S. patent application Ser. No. 15/223,968, filed 29 Jul. 2016, which claims the benefit of U.S. Provisional Application No. 62/198,222, filed on 29 Jul. 2015, both of which are incorporated in their entireties by this reference.

This Application is a continuation application of U.S. patent application Ser. No. 15/224,003, filed 29 Jul. 2016, which claims the benefit of U.S. Provisional Application No. 62/198,222, filed on 29 Jul. 2015, both of which are incorporated in their entireties by this reference.

This Application is related to U.S. patent application Ser. No. 14/499,001, filed on 26 Sep. 2014, which is incorporated in its entirety by this reference.

TECHNICAL FIELD

This invention relates generally to the field of touch sensors and more specifically to a new and useful system and method for manipulating a virtual environment.

DESCRIPTION OF THE EMBODIMENTS

The following description of the embodiments of the invention is not intended to limit the invention to these embodiments but rather to enable a person skilled in the art to make and use this invention.

1. First Method

Figure 1:
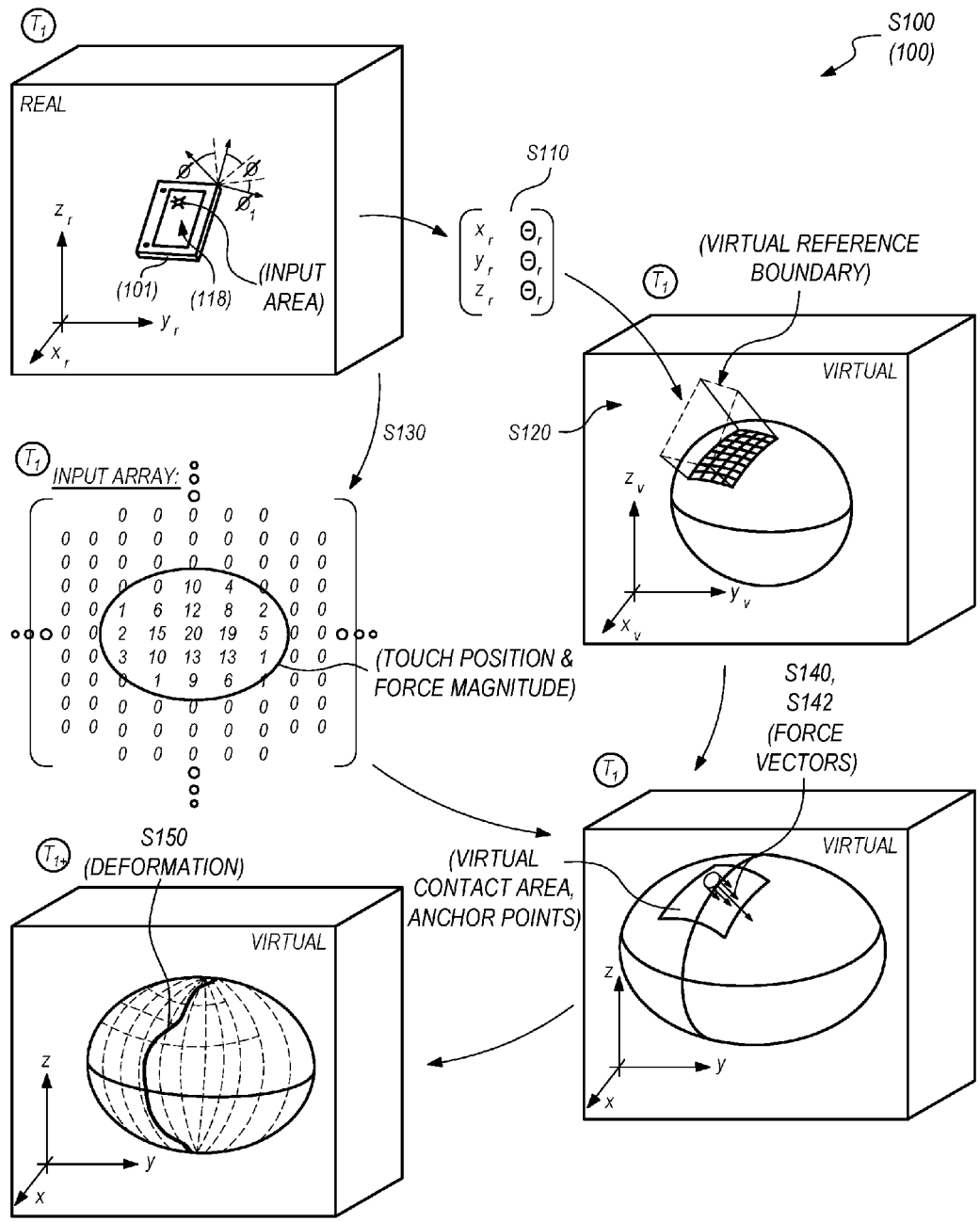
FIG. 1 is a flowchart representation of a first method.

As shown in FIG. 1, a first method S100 for manipulating a virtual environment includes: detecting a touch sensor surface in a real space in Block S110; based on a position of the touch sensor surface in the real space, mapping the touch sensor surface to a virtual surface in a virtual environment in Block S120; receiving a touch image defining a magnitude and a position of a force on the touch sensor surface in Block S130; based on an orientation of the touch sensor surface in the real space, assigning a three-dimensional direction to the force to construct a vector in Block S140; and modifying the virtual surface according to the vector within the virtual environment in Block S150.

Figure 3:
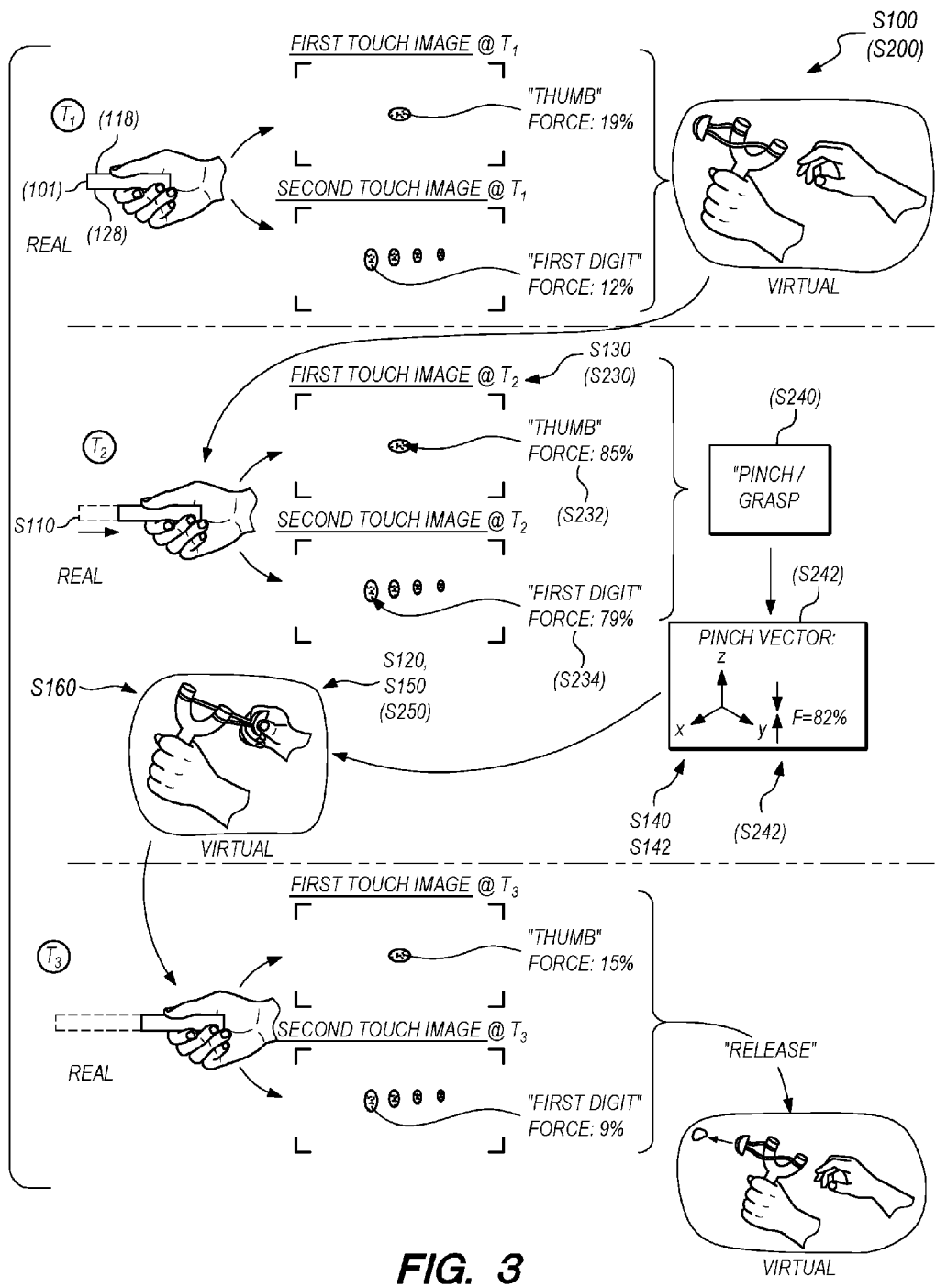
FIG. 3 is a flowchart representation of one variation of the first method and a second method.

As shown in FIG. 3, one variation of the first method S100 includes: at a first time, determining a first position of a touch sensor within a real space, the touch sensor including a touch sensor surface in Block S110; based on the first position of the touch sensor within the real space at the first time, bounding a virtual surface of a virtual object within the virtual environment tractable through inputs across an area of the touch sensor surface in Block S120; generating a first force vector including a magnitude related to a force magnitude of a first input on the touch sensor surface and a direction related to an orientation of the touch sensor within the real space at the first time in Block S140; locating an origin of the first force vector within the virtual environment based on a first location of the first input on the touch sensor surface and the first position of the touch sensor within the real space in Block S142; and manipulating the virtual surface of the virtual object within the virtual environment according to the first force vector in Block S150.

1.1 Applications

Generally, the first method S100 can be executed by a computer system hosting a virtual environment to link user inputs within physical space to virtual objects within the virtual environment. In particular, the computer system can interface with an input device (e.g., a handheld device) including a touch sensor surface to receive force magnitude and position data of a user input on the touch sensor, track the position and orientation of the input device within the real space, map the real touch sensor to a virtual surface or virtual object within the virtual environment based on the position and orientation of the input device in real space, and then manipulate the virtual surface or virtual object based on the force magnitude and location of the input on the touch sensor surface and the position and orientation of the input device in real space.

A computer system executing the first method S100 can fuse the force magnitude of an input on a touch sensor surface, an orientation of the touch sensor surface in real space, and the location of the input on the touch sensor surface into: a force vector (i.e., a force magnitude and a direction); and an origin of the force vector within the virtual environment. The computer system can then project the force vector into a virtual environment to define a magnitude and direction of a change in the position, size, or geometry, etc. of a virtual object and/or a virtual surface within the virtual environment, thereby linking user inputs on the touch sensor surface in physical (i.e., real) space to control or manipulate virtual objects or virtual surfaces within the virtual environment.

Figure 2:
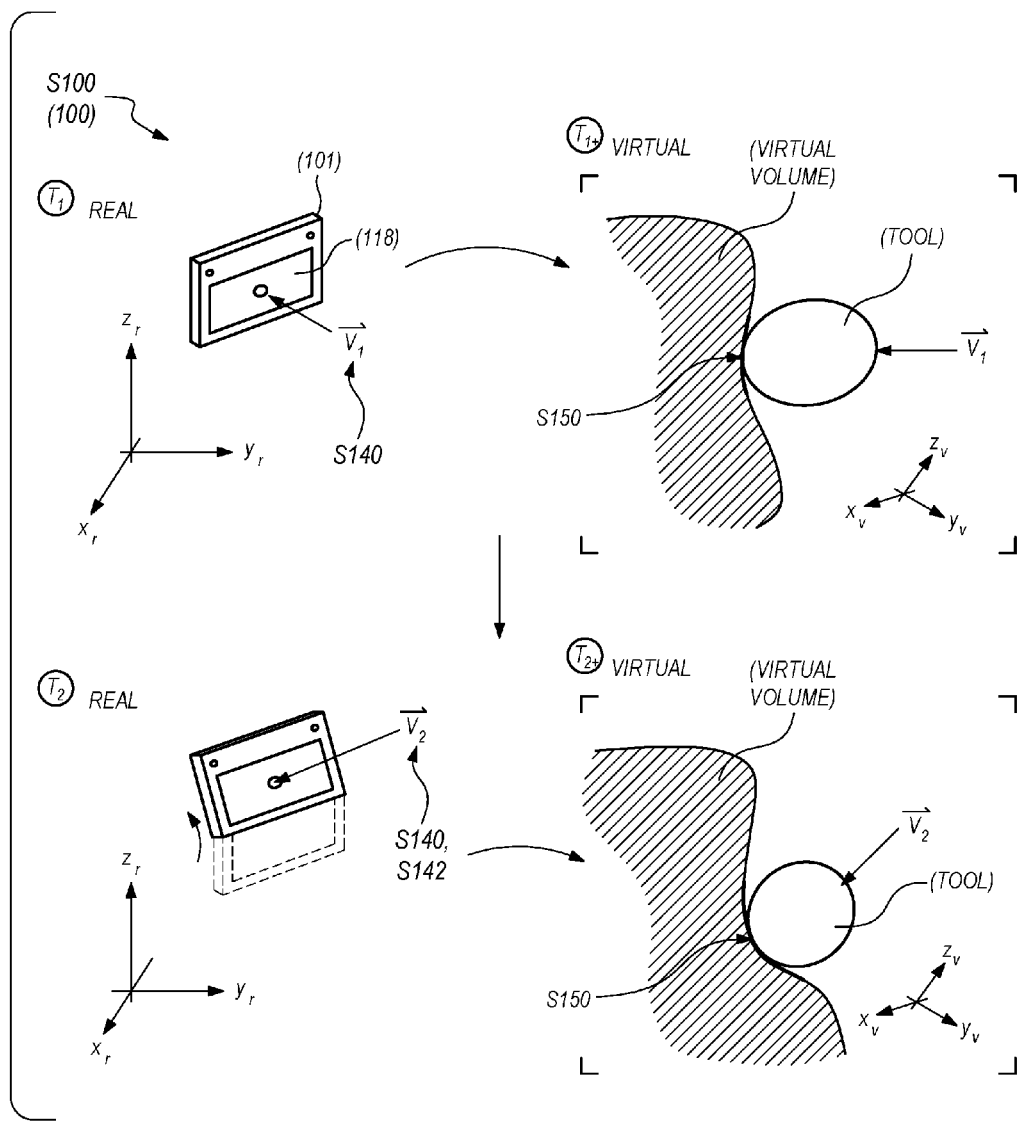
FIG. 2 is a flowchart representation of one variation of the first method.

In one example of the first method S100, in response to application of an input object (e.g., a stylus, a finger) on a particular static location on the touch sensor surface, wherein the particular location on the touch sensor surface is mapped to an area on a virtual surface of a virtual three-dimensional object, the computer system can shift this area of the virtual three-dimensional object inward at a rate and/or by a degree corresponding to the force magnitude of the input and in a direction corresponding to the orientation of the touch sensor surface in real space, as shown in FIG. 2. In this example, as the input object moves from the particular location to a second location on the touch sensor surface, the computer system can displace this area on the surface of the virtual object in a direction corresponding to (or opposite) the initial magnitude of the applied force and form a virtual valley in the surface of the virtual object along a trajectory corresponding to the trajectory of the input object from the initial contact location to the second location on the touch sensor surface, thereby enabling a user to move, manipulate, and modify a virtual surface of a virtual object within a virtual environment by moving a touch sensor to a position in real space corresponding to the virtual surface and then modulating the magnitude and position of a force applied to the touch sensor, such as with a finger or stylus.

The computer system can implement Blocks of the first method S100 (and the second method S200 described below) to map a force applied to the touch sensor surface to a virtual object or to a surface of a virtual object, such as to push or pull (i.e., translate) the virtual object, to rotate the virtual object, to bend or twist the virtual object, to deform the virtual surface, to smooth or texture the virtual surface, etc. within a virtual environment according to various input modes. The first method S100 (and the second method S200 described below) is described herein generally to deform or "push" a virtual object or virtual surface inwardly according to a force applied to the touch sensor surface of the input device; however, the computer system can also pull, twist, rotate, smooth, roughen (e.g., "texture"), or otherwise manipulate or modify a virtual object or virtual surface according to a force applied to the touch sensor surface. Furthermore, the computer system can selectively apply these modes during operation, such as: modally according to selection of a button or switch on the input device; or gesturally according to a gesture applied to the touch sensor surface, a number of fingers applied to the touch sensor surface by a user, or a part of a hand or finger applied to the touch sensor surface by the user, as described below.

The first method S100 is described herein as a method for manipulating a virtual environment, such as a virtual reality environment. However, the first method S100 can be similarly implemented to manipulate an augmented reality environment, such as within a surgical environment.

1.2 Input Device

Block S130 of the first method S100 recites receiving a touch image defining a magnitude and a position of a force on the touch sensor surface. Generally, in Block S130, the computer system interfaces with (or incorporates, integrates with) an input device including a touch sensor and a touch sensor surface, as described below, to receive a position and force magnitude of an input on the touch sensor surface, such as in the form of a touch image.

The input device is described herein as an input device that includes at least one pressure-sensitive touch sensor and that outputs the location ((X,Y) position) and force magnitude of one or more contact areas (or "inputs") on the (real) touch sensor surface. In one example, the input device includes a tablet containing an opaque rectilinear body and a planar touch sensor surface on one side of the opaque body. In a similar example, the input device can include an opaque rectilinear body defining two opposing sides and a planar touch sensor surface across each of the two sides. Alternatively, the input device can include a spherical, cubic, brick-shaped, or soap bar-shaped (e.g., rectilinear with fileted corners) body with a touch sensor surface integrated across one or more planar or non-planar surfaces of the body.

Generally, the input device can incorporate one or more pressure-sensitive touch sensors including an array of sense electrodes (e.g., sensing pixels, or sense elements), such as described in U.S. patent application Ser. No. 14/499,001, and can output a single force magnitude value per contact area (i.e., an area of the touch sensor surface contacted by a real object, such as a finger, a stylus, or a paintbrush) on the touch sensor surface per scan period. For example, the input device can scan the pressure-sensitive touch sensor at a rate of 100 Hz and record a peak force within a contact area detected on the touch sensor surface, an average force across the contact area, and/or a force at an effective center or a centroid of the contact area for each discrete contact area on the touch sensor surface for each scan period. The touch sensor can then package these input locations, input areas, and input force magnitudes into one matrix or one other container per scan period before uploading this container to the computer system in Block S130.

Alternatively, the input device can record a force value at each sense element location within the pressure-sensitive touch sensor and package these force values into one touch image per scan period. For example, the input device can include: a grid array of discrete sense elements (e.g., sense and drive electrode pairs) arranged under a resistive layer exhibiting local variations in contact resistance with the sense element responsive to local changes in force applied to the touch sensor surface over the resistive layer; and a controller configured to read a resistance value from each sensor during a scan period, to transform each resistance value into a force magnitude value, and to populate a touch image within these force values. The controller can also interpolate force magnitudes between adjacent sense element locations to achieve a touch image containing force magnitude values representing sense element locations at a resolution of one millimeter across the touch sensor surface. The input device can thus detect and record the force magnitude—over a spectrum of force magnitudes sensible by the array of sense elements—of an input on the touch sensor, detect locations of an input as the input moves over the touch sensor surface, and detect multiple inputs simultaneously across the touch sensor surface.

Therefore, in addition to force magnitude of an input on the touch sensor surface, the input device can also output one or more locations (e.g., X and Y coordinates) on the touch sensor surface in contact with a real object. For example, the input device can output the (X,Y) position of single force value on the touch sensor surface or the (X,Y) position of each force value on the touch sensor surface above a baseline force value. In this example, the input device can reset a baseline force value for the pressure-sensitive touch sensor over time, such as based on the mode of force values across the touch sensor surface to compensate for replacement of a physical overlay over the surface, to compensate for changes in barometric pressure, and/or to compensate for sensor drift across the pressure-sensitive touch sensor. The input device can thus generate and output a touch image containing sufficient information to reconstruct the position, shape, contact profile, location, and applied force of an object in contact with the touch sensor surface.

For each scan period, the input device can generate a touch image (e.g., in the form of a matrix) representing force values (differential force values, relative a baseline force value) measured at each discrete (and interpolated) sensor location within the pressure-sensitive touch sensor, as shown in FIG. 1, and the input device can push (i.e., transmit) the touch image for each scan period to the computer system executing the first method S100 substantially in real-time over wired or wireless communication protocol in Block S130. Alternatively, the computer system can regularly broadcast a query to the input device for a lateral position, a longitudinal position, and a force magnitude of each discrete input area on the touch sensor surface, such as in the form of one or more current touch images at a rate of 60 Hz (or 60 Hz, or between 90 Hz and 120 Hz). The computer system can then process each touch image remotely from the input device, including identifying discrete input areas, calculating a peak force per discrete input area, calculating a total force per discrete input area, labeling or characterizing a type of physical object contacting the touch sensor surface and corresponding to each discrete input area, etc., such as described below. Alternatively, the input device can locally process a touch image before uploading the touch image and/or data extracted from the touch image (e.g., types, force magnitudes, and locations of discrete input areas) to the computer system.

1.3 Real Position and Orientation

Block S110 of the first method S100 recites, at a first time, determining a first position of a touch sensor within a real space, the touch sensor including a touch sensor surface. Generally, in Block S110, the computer system functions to record a real position and orientation of the input device.

In one implementation, the computer system tracks and records the position and orientation of the input device in six degrees of freedom, such as including: a lateral (e.g., X-axis) position; a vertical (e.g., Z-axis) position; a depth (e.g., Y-axis) position; a pitch orientation (e.g., angular position about the Y-axis); a yaw orientation (e.g., angular position about the Z-axis); and a roll orientation (e.g., angular position about the Z-axis) of a reference point of the input device relative to a static coordinate system (or static reference point) within the real space. For example, the computer system can track the position and orientation of a center of the input device, a reference corner of the input device, or other reference point on the input device relative to a position tracking base station, a virtual reality (VR) headset, an augmented reality (AR) headset, or other computer housing or sensor.

In one implementation, the computer system interfaces with a three-dimensional position sensor—such as a LIDAR sensor or a structured light three-dimensional sensor occupying a common space with the input device—to scan the real space for the input device; by regularly sampling the three-dimensional position sensor during operation, the computer system can track the position and orientation of the input device over time. For example, the input device can incorporate two or more quick-response codes, infrared or photo emitters, and/or other active or passive fiducials arranged on surfaces of the input device. A camera or optical sensor(s) arranged within the real space with the input device within the field of view captures and outputs image frames to the computer system. In this example, the computer system implements computer vision techniques to identify the fiducials in each image frame, correlates relative positions of the fiducials with an orientation of the input device and a distance of the input device from the camera, and determines lateral and vertical positions of the input device within the real space relative to the camera based on positions of the fiducials within an image frame. In another example, the input device incorporates and selectively drives three perpendicular magnetic coils, and a base station (arranged within the real space) includes three perpendicular magnetic field sensors that it samples to track strengths and orientations of magnetic fields output from the input device; the base station then calculates the position and orientation of the input device—during the sampling period—relative to the base station according to the strengths and orientations of these magnetic fields. However, the computer system can cooperate with the input device and/or another peripheral device to calculate the position and orientation of the input device in each sampling (or scan) period.

Alternatively, the input device can track its own position within the real space—such as at a refresh rate of 60 Hz—and uploads values representing its position and orientation to the computer system for each sampling period substantially in real-time. In one example, the input device samples integrated inertial sensors (e.g., a three-axis accelerometer, a three-axis gyroscope, a compass), implements dead reckoning techniques to estimate the position of the input device at each sampling period based on outputs of the inertial sensors, and wirelessly broadcasts position and orientation values to the computer system. In another example, the input device includes a set of optical detectors that detect incident light emitted from one or more base stations arranged within the real space, and a processor within the input device correlates positions and intensities of light incident on the sensors during a sampling period with positions and orientations of the input device within the real space relative to the base station(s); in this example, the input device then broadcasts the calculated position and orientation of the input device for the sampling period to the computer system. For a sampling (or scan) period at the input device, the input device can also record and timestamp outputs of inertial sensors integrated into the input device, and the input device (or the computer system) can transform these outputs into a real orientation (e.g., pitch, yaw, roll) of the input device—such as relative to gravity and compass north as determined from outputs of the inertial sensors—for the sampling period.

However, the computer system can interface with the input device and/or any other integrated or external device or sensor to track the position and orientation of the input device in real space across consecutive sampling periods during operation of the input device and computer system.

In one implementation shown in FIG. 1, the input device augments a touch image—containing input location and force magnitude data for the touch sensor surface collected during a particular scan period (as described above)—with a timestamp corresponding to the particular scan period before pushing the touch image to the computer system in Block S130, as described below. During operation, the computer system: transforms real position and orientation tracking data of a reference point on the input device at the particular (e.g., current) sampling period into a real position and orientation of the touch sensor surface; maps the touch sensor surface to a virtual surface in the virtual environment in real-time in Block S120 according to the real position and orientation of the touch sensor surface for the sampling period; matches the touch image received from the input device to the current sampling period in time based on a similar timestamps; merges the real orientation of the touch sensor surface and the touch image recorded at similar times into a force vector and an anchor for the force vector for the particular sampling period in Blocks S140 and S142; and then manipulates a portion of the virtual surface corresponding to the position and orientation of the real surface according to the force vector and the anchor point of the force vector substantially in real-time (e.g., substantially immediately after the times recorded in the first and second timestamps) in Block S150.

1.4 Real Surface to Virtual Surface

Block S120 of the first method S100 recites, based on the first position of the touch sensor within the real space at the first time, bounding a virtual surface of a virtual object within the virtual environment tractable (e.g., controllable, manipulatable) through inputs across an area of the touch sensor surface. (Block S120 can similarly recite, based on a position of the touch sensor surface in the real space, mapping the touch sensor surface to a virtual surface in a virtual environment.) Generally, in Block S120, the computer system functions to project a real surface (i.e., the touch sensor surface in real space) onto a virtual surface of a virtual object within the virtual environment to define a region of the virtual object that a user may virtually grasp, virtually translate, virtually rotate, virtually scale, or otherwise virtually manipulate by moving the input device in real space, by moving a finger, stylus, or other object across the touch sensor surface, and/or by modulating a force applied to the touch sensor surface.

In one implementation, the computer system maps a reference point on the input device (e.g., on the touch sensor surface) to a virtual point on a virtual surface (or within a virtual object) within the virtual environment based on the lateral, vertical, and depth positions of the touch sensor surface within the real space. Based on the orientation of the touch sensor surface within the real space, the computer system then bounds a region of the virtual surface (or a virtual slice of the virtual object) anchored by the virtual point and corresponding to the size and geometry of the touch sensor surface. The computer system can thus define a general bounded virtual surface within the virtual model that can be manipulated by the user through touch inputs on the touch sensor surface. The computer system can also locate an origin of the force vector to a specific position within the bounded region of the virtual surface in Block S142 based on the position of an input applied to the touch sensor surface. Specifically, the computer system can define a global (or "macro") region of a virtual object controllable through inputs on the touch sensor surface of the input device based on the position of the touch sensor surface in real space and then define a specific location of the origin of the force vector within the virtual environment based on the position of an input on the touch sensor surface, such as the centroid of the area of an input or the location of the peak force measured within the area of the input, in Block S142. For example, the computer system can map the origin of the force vector to a vertex, triangle, or point in a 3D mesh representing the virtual environment. In another example, the computer system can map the origin of the force vector to a particular pixel within a texture mapped to the 3D mesh representing the virtual environment.

In one implementation, the computer system locates a virtual reference boundary representing the touch sensor surface within the virtual environment and projects rays from the virtual reference boundary onto the virtual surface, as shown in FIG. 1, in order to map the touch sensor surface to the virtual surface. For example, the touch sensor surface can define a substantially planar rectilinear area (e.g., a 120 millimeter by 200 millimeter planar area), and the computer system can locate a rectangular, 3:5 aspect ratio, virtual reference boundary—representing the touch sensor surface—within the virtual environment based on the position and the orientation of the touch sensor surface in real space, project rays from the corners of the virtual reference boundary (and normal to the plane of the virtual reference boundary) onto a nearest virtual surface within the virtual environment to define select points on the virtual surface, and connect adjacent points on the virtual surface to define a manipulatable region of the virtual surface. Thus, in Block S120, the computer system can: project a rectangular reference boundary corresponding to a rectangular, planar area of the touch sensor surface onto the virtual surface of a three-dimensional virtual object according to the position and the orientation of the touch sensor within the real space; and can enable control of the region of the virtual surface bounded by this projection of the rectangular reference boundary on the virtual object through manipulation of the input device and according to inputs on the touch sensor, thereby mapping the touch sensor surface to the virtual surface.

In a similar implementation, the computer system: locates a virtual reference plane representing the touch sensor surface within the virtual environment based on the position and orientation of the touch sensor surface in real space; projects rays normally outward from the virtual surface—and toward a virtual reference plane—within the virtual environment; and maps real points on the touch sensor surface to virtual points on the virtual surface according to origins of rays emanating from the virtual surface and intersecting corresponding points on the virtual reference plane. The computer system can therefore project a region of the virtual surface onto a virtual reference boundary—representing the touch sensor surface—within the virtual environment to map the virtual surface to the touch sensor surface.

In the foregoing implementations, the computer system can set static virtual dimensions for the virtual reference boundary. Alternatively, the computer system can scale the virtual dimensions of the virtual reference boundary (e.g., with length-to-width ratio static) based on a position of the input device in the real space, such as based on a distance between a reference point on the input device and a reference origin or reference plane assigned to the real space. For example, as a user moves the input device forward (relative to the reference plane assigned to the real space) to zoom into the virtual model, the computer system can scale down the virtual dimensions of the virtual reference boundary representing the touch sensor surface in the virtual environment, thereby reducing the size of the bounded region of the virtual surface mapped to the touch sensor surface and enabling finer positional control of the virtual surface (or of a virtual tool contacting or acting on the virtual surface) within the virtual environment through the touch sensor surface. Similarly, in this example, as the user moves the input device backward to zoom out from the virtual model, the computer system can increase the scale of the virtual reference boundary representing the touch sensor surface in the virtual environment, thereby increasing the size of the bounded region of the virtual surface mapped to the touch sensor surface and enabling more global manipulation of the virtual surface or of the virtual object through the touch sensor surface. Therefore, in Block S120, the computer system can: increase a scale of the (rectangular) reference boundary in response to movement of the touch sensor in a first direction relative to a user within the real space; and decrease a scale of the rectangular reference boundary in response to movement of the touch sensor in a second direction opposite the first direction within the real space.

When generating a force vector for a sampling period in Block S140, the computer system can additionally or alternatively scale a magnitude of a force recorded in a touch image according to the position of the touch sensor surface within the real space. For example, given substantially constant application of a force over an input area on the touch sensor surface over a sequence of sampling periods, the computer system can increase the force magnitude of force vectors generated over the sequence of sampling periods as the user pushes the input device forward over the same period of time; and the computer system can reduce the force magnitude of successive force vectors generated over the sequence of sampling periods as the user pulls the input device back over the same period of time.

The computer system can execute the foregoing methods and techniques regularly throughout operation, such as once per sampling period at the input device, to recalculate a virtual surface on the virtual object in the virtual environment that is mapped to and manipulated via inputs on the touch sensor surface in response to movement of the input device within the real space (and thus relative to the virtual environment). Alternatively, the computer system can statically lock the (physical) input object to the virtual object, move the virtual object within the virtual environment according to movements of the input device in the real space, and preserve the virtual surface of the virtual object mapped to the touch sensor surface over time. For example, for the virtual object that represents a virtual tool, such as a pair of virtual pliers, the computer system can move the virtual pliers within the virtual environment according to movement of the input device in the real space, map the touch sensor surface (or a portion of the touch sensor surface) to handles of the virtual pliers, open and close the virtual pliers according to the proximity of two inputs on the touch sensor surface, and close the pliers according to force magnitudes of the two inputs on the touch sensor surface.

In variations of the input device that include a curvilinear (e.g., semi-cylindrical or semi-spherical) touch sensor surface, as described below, the computer system can implement similar methods and techniques to map (and scale) a curvilinear reference boundary—corresponding to the geometry of the curvilinear touch sensor surface—to a planar or curvilinear virtual surface of a virtual object within the virtual environment. For example, for the input device that defines a cylindrical touch sensor surface, the computer system can virtually "unwrap" the cylindrical touch sensor surface into a planar reference boundary and map this planar reference boundary to a virtual surface of a virtual object in the virtual environment, as described above. In another example, for the input device that defines a cylindrical touch sensor surface, the system can axially align a cylindrical reference boundary to an axis of a three-dimensional virtual object—of a geometry approximating a cylinder—in the virtual environment and then project the cylindrical virtual reference boundary onto an adjacent region of the virtual object to define a region of the virtual object in the virtual environment manipulatable via the touch sensor surface in the real space.

1.5 Visual Feedback

In one implementation, the computer system renders a virtual marker representing the size, shape, position, and/or orientation of the touch sensor surface within the virtual environment. For example, the computer system can render a virtual solid or dashed white box corresponding to the perimeter of the touch sensor surface within the virtual environment, such as floating within the virtual environment or projected onto the region of the virtual surface of the virtual object mapped to the touch sensor surface. In this example, the computer system can update the position of virtual box within the virtual environment for each consecutive sampling period based on the real position and orientation of the touch sensor surface in real space. The computer system can also scale the virtual box within the virtual environment as the user moves the input device forward and backward (or in any other direction) within the real space.

Similarly, the computer system can render a virtual tool (e.g., virtual pliers, a virtual gun) or a virtual hand in the virtual environment representing the input device in the real space. The computer system can also move (e.g., translate, rotate) the virtual tool or virtual hand in the virtual environment according to movement of the input device in the real space. Furthermore, the computer system can modify or manipulate surfaces or volumes of the virtual tool or virtual hand based on positions and force magnitudes of inputs on the touch sensor surface. For example, the computer system can: move a virtual trigger of a virtual gun a distance corresponding to a force magnitude of an input on the touch sensor surface at a location corresponding to the virtual trigger; close a pair of virtual pliers a virtual distance and with a virtual clamping force corresponding to the positions and force magnitudes, respectively, of two inputs on the touch sensor surface, as described above; or move virtual fingers of a virtual hand in adduction or abduction according to the positions of inputs on the touch sensor surface and move these virtual fingers in flexion and extension according to force magnitudes of these inputs on the touch sensor surface, as described below.

1.6 Force Vector

Block S140 of the first method S100 recites generating a first force vector including a magnitude related to a force magnitude of a first input on the touch sensor surface and a direction related to an orientation of the touch sensor within the real space at the first time. (Block S140 can similarly recite, based on an orientation of the touch sensor surface in the real space, assigning a three-dimensional direction to the force magnitude to construct a force vector.) The first method S100 can also include Block S142, which recites locating an origin of the first force vector within the virtual environment based on a first location of the first input on the touch sensor surface and the first position of the touch sensor within the real space. Generally, in Blocks S140 and S142, the computer system combines a magnitude of a force applied to the touch sensor surface with an orientation of the touch sensor surface within the real space (within a sampling or scan period) and the location of the applied force on the touch sensor surface to generate a virtual force vector representing a magnitude, direction, and origin of a virtual force to be applied to a virtual surface (or to the virtual object generally) within the virtual environment to manipulate the virtual object in Block S150.

As described above, the input device can output a touch image representing a magnitude of applied forces detected by each sense element in the touch sensor (and interpolated force magnitudes between sense elements in the touch sensor) during a corresponding scan period, as shown in FIG. 1; and the computer system can determine the real position and orientation of the input device—such as relative to an origin or relative to a coordinate system assigned to the real space occupied by the input device—at the same or similar time during operation of the input device and computer system. To generate a force vector for a scan period, the computer system can: identify a discrete input area represented in the touch image (e.g., a contagious area of elevated applied force values bounded by baseline force values in the touch image); store the (X,Y) location of the centroid of the discrete input area or the (X,Y) location of a point of peak force magnitude in the discrete input area as the location of a corresponding input on the touch sensor surface; calculate a direction of a real force vector normal to and facing into the touch sensor surface, such as relative to an origin of a coordinate system assigned to the real space; record a real force magnitude of the discrete input area, such as a peak force magnitude, a total force magnitude, or an average force magnitude within the discrete input area. The computer system can then: pair the real direction with a real magnitude of the applied force represented in the touch image to generate a "real force vector"; and translate the real force vector into a "virtual" force vector by applying a transformation—that maps the coordinate system assigned to the real space to a coordinate system in the virtual environment—to the real force vector in Block S140.

The computer system can also anchor an origin of the virtual force vector within the virtual environment by mapping the (X,Y) position of the discrete input area on the touch sensor surface to a point on the virtual surface in Block S142. For example, the computer system can project a normal ray from a point on a virtual reference boundary—representing the perimeter of the touch sensor surface, as described above, and corresponding to the position of the force on the touch sensor surface—within the virtual environment onto the virtual surface and anchor the virtual force vector at a point on the virtual surface intersected by the normal array. Alternatively, the computer system can anchor the origin of the virtual force vector within the virtual environment by: determining a real position of the discrete input area in real space based on the (X,Y) location of the input on the touch sensor surface and the position and orientation of the input device in real space; and then applies the transformation described above to the real position of the discrete input area to locate the origin of the virtual force vector in the virtual environment.

The computer system can implement the foregoing methods and techniques for each input on the touch sensor surface—corresponding to a total or peak force magnitude above a baseline force—detected by the touch sensor and recorded in a touch image for each consecutive scan period during operation of the input device and computer system. The computer system can thus generate one force vector for each discrete input on the touch sensor surface represented in each touch image output by the input device, as shown in FIG. 1.

1.7 Motion Vector

The computer system can also generate a motion vector representing a change in position and/or orientation of the input device between two (or more) consecutive sampling periods. The computer system can then move the virtual object globally according to this motion vector and move, modify, deform, or otherwise manipulate the virtual object locally (e.g., at the virtual surface mapped to the touch sensor surface) based on the position and force magnitude of one or more inputs on the touch sensor surface.

In one example in which the virtual object includes a virtual baseball, the computer system can virtually grip the virtual baseball in a virtual hand—linked to the input device—based on a magnitude of a force magnitude of one or more inputs applied to the touch sensor surface, and the computer system can translate and rotate the virtual baseball within the virtual environment according to changes in the position of the input device in the real space. As a user moves the input device rapidly forward (e.g., over his right shoulder and forward) in the real space and releases one or more inputs on the touch sensor surface (e.g., integrated into a cylindrical or spherical input device with a wrist strap that retains the input device near the user's palm, as described below), the computer system can generate a motion vector for the virtual baseball corresponding to the real trajectory of the input device in real space and virtually "release" the virtual baseball in the virtual environment according to the motion vector upon release of the input(s) on the touch sensor surface. Furthermore, in this example, the computer system can: map the touch sensor surface to a virtual surface of the virtual baseball; track the location and force magnitudes of inputs on the touch sensor surface to calculate and locate a force vector for each input on the touch sensor surface; and release the virtual baseball with virtual spin based on the magnitude of a particular force vector corresponding to a last input on the touch sensor surface, the location of the particular force vector relative to the virtual center of mass of the virtual baseball, and the angle of the particular force vector to the virtual surface of the virtual baseball as all other inputs are withdrawn from the touch sensor surface to release to the virtual baseball in the virtual environment.

1.8 Calibration

One variation of the first method S100 further includes: at an initial time preceding the first time, serving a prompt to a user to apply a force of subjective qualitative value to the touch sensor surface; recording a magnitude of an initial force applied to the touch sensor surface responsive to the prompt; and scaling the magnitude of the first force vector based on the magnitude of the initial force. Generally, in this variation, the computer system can interface with the input device to calibrate a scale factor for transforming a force magnitude of an input on the touch sensor surface into a magnitude of the virtual force vector to a user (e.g., to the user's size or strength).

In one example, the computer system can issue a prompt to a user at startup (e.g., when entering or about to enter a virtual environment through a virtual reality headset) to sequentially press "lightly," to press with "moderate force," and/or to press "firmly" onto the touch sensor surface with a finger (or with a stylus or other object) and then collect touch images from the input device as the user enters one or more such inputs on the touch sensor surface. Based on the peak or total force magnitude of each input, the computer system can: adjust force magnitude thresholds that then must be exceeded by (or exceed) an input on the touch sensor to trigger an action within the virtual environment; and/or recalculate a scale factor for transforming a force magnitude of an input on the touch sensor surface into a magnitude of the virtual force vector. In a similar example, the computer system can prompt a user—such as through a heads-up display in a virtual reality or augmented reality headset worn by the user—to enter a force of magnitude "5" on a scale of "1" to "10" and then adjust the scale factor for transforming an input on the touch sensor surface into a force vector according to the peak or total force at an input area on the touch sensor surface represented in a subsequent touch image received from the input device.

The computer system can thus execute a calibration routine during operation in order to enable users of different sizes and strengths—interfacing with the same input device and computer system over time—to apply personalized ranges of forces on the touch sensor surface to enter similar control commands into the virtual environment. However, the computer system can implement any other method or technique to calibrate a force magnitude scale factor for a user interfacing with the input device.

Furthermore, the touch sensor surface on the input device can define a continuous surface without discrete input positions, and the computer system can map input controls to discrete input areas represented in a touch image received from the input device, thereby enabling users with different hand sizes (e.g., both a five-year-old chair and an adult male) to manipulate similar virtual objects in similar ways within similar virtual environments through an input device and touch sensor surface of one size and configuration. For example, upon selecting the input device, a user can place her fingers on the touch sensor surface in a position that she finds comfortable, the input device can output a touch image that represents the position of the user's fingers on the touch sensor surface, and the computer system can calibrate control functions for the virtual environment to these discrete input areas represented in the touch image, such as by mapping control functions to the positions of the user's fingers represented in the touch image—rather than require the user to place her fingers over predefining input regions on the input device.

1.9 Modifying the Virtual Surface

Block S150 of the first method S100 recites modifying the virtual surface according to the vector within the virtual environment. Generally, in Block S150, the computer system manipulates a virtual surface (or a virtual object) within the virtual environment according to the force magnitude and direction of a virtual force vector generated in Block S120.

In one implementation and as shown in FIG. 1, the computer system moves and/or deforms a virtual surface (or a virtual object) within the virtual model according to a virtual force vector and a physics model defining mechanical creep, elastic deformation, plastic deformation, and/or inertial dynamics, etc. of the virtual surface and/or the virtual object. In particular, the computer system can implement the physical model to: calculate deformation of a virtual surface mapped to the touch sensor surface; calculate changes in the position and orientation of a virtual object; and calculate inertial effects on the virtual object resulting from a virtual force—of magnitude, direction, and position (e.g., origin) defined in the virtual force vector—applied to the virtual surface over the duration of one scan period. The computer system can update the virtual surface (or the virtual object) rendered within the virtual environment accordingly in Block S160 described below, such as by generating a new two-dimensional or three-dimensional digital frame representing the virtual environment given a current viewing position of the user and then uploading the new frame to a digital display, VR headset, or AR headset for presentation to the user substantially in real-time.

For consecutive scan periods in which the input device generates and uploads touch images representing one or more input forces to the computer system, the computer system can also smooth virtual object manipulations between consecutive scan periods and/or remove signal noise across the input device and computer system by averaging positions and magnitudes of forces on the touch sensor surface over a sequence of consecutive scan periods. For example, the computer system can track one input on the touch sensor surface in five touch images corresponding to the last five scan periods at the touch image and average the positions and force magnitudes of this one input over the last five touch images with the current scan period given greatest weight to calculate a force vector for the current scan period. The computer system can also average positions and orientations of the input device over a similar sequence of sampling periods, such as the last five sampling periods up to the current sampling period with the current sampling period given greatest weight to calculate a motion vector, as described above, for the current sampling period.

Figure 6:
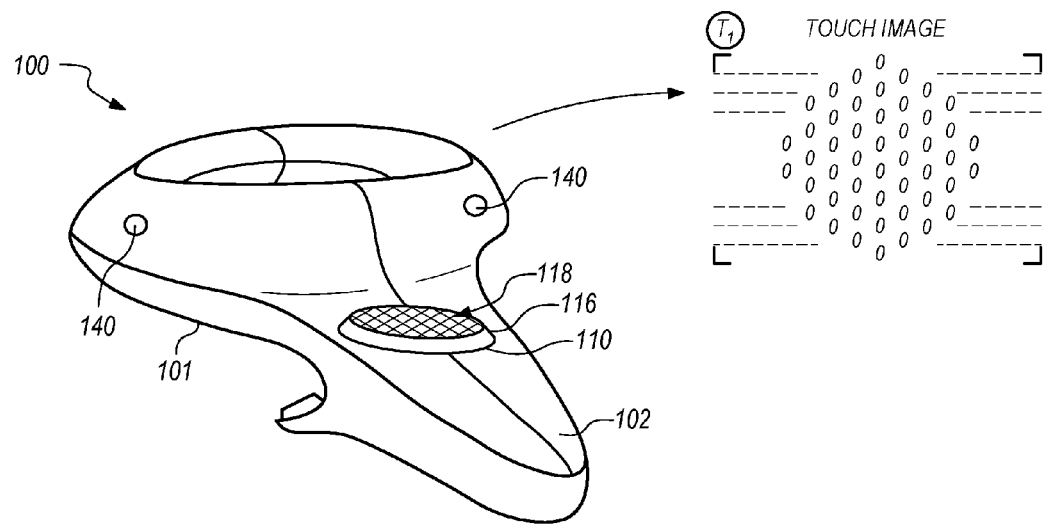
FIG. 6 is a flowchart representation of a system.

In one example implementation in which the input device includes a single, substantially flat (e.g., planar) pressure-sensitive touch sensor and one touch sensor surface, such as shown in FIGS. 1 and 6, the computer system transforms a force applied to the touch sensor surface into a local inward deformation of a virtual surface of a virtual object in the virtual environment—corresponding to the touch sensor surface in real space—according to a force vector generated according to the position and force magnitude of an input on the touch sensor surface and the position and orientation of the touch sensor surface in real space in Block S150. In this example implementation, the computer system can deform a local region of the virtual surface that intersects the virtual force vector; the perimeter of the deformed local region can define a size and geometry related to the size and geometry of the contact area of the input on the touch sensor surface; deformation within the local region can correspond to the force profile across the corresponding input on the touch sensor surface; and the location and magnitude of maximum deformation of the local region of the virtual surface also corresponding to the location and magnitude of the peak force within the corresponding input area. The computer system can also "stretch" a peripheral region of the surface around the deformed region as the user continues to apply a force to the touch sensor surface over a series of consecutive scan periods, such as based on a modulus of elasticity defined in a physical model assigned to the virtual object. In this example implementation, to pull the deformed region of the virtual surface back to its previous contour, the user can flip the input device 180° about its X- or Y-axis (i.e., turn the input device around to face the back side of the input device) and apply an input at a similar location and of a similar force magnitude on the touch sensor surface; the computer system can thus detect this new position of the input device, identify an input on the touch sensor surface at a location corresponding to the deformed region of the virtual surface, and deform the local region of the virtual surface outwardly according to the force magnitude and the position of the input on the touch sensor surface and the position and orientation of the touch sensor surface in real space.

In a similar example implementation in which the input device includes a first touch sensor surface on one side of the input device and a second touch sensor surface on an opposite side of the input device, the computer system can deform (or "push") a region of a virtual surface inwardly when a force is applied to the first touch sensor surface and can deform (or "pull") the region of the virtual surface outwardly when a force is applied to an opposing location on the second touch sensor surface.

In one example application, the computer system interfaces with the input device—including a first touch sensor on one side of the input device and a second touch sensor on a second side of the input device opposite the first touch sensor—to control a virtual clay wheel-throwing environment. In this example application, the computer system: generates digital (two- or three-dimensional) frames of a virtual environment including a potter's wheel, a virtual mass of clay, and virtual hands; and translates a force profile across a contact area of an input object on the touch sensor surface into a virtual finger (or fingers, palm, hand) that works the virtual clay mass spinning on the virtual potter's wheel. For example, as a user depresses a thumb on the first touch sensor, the computer system can update frames of the virtual environment to show a virtual thumb (or first virtual forming tool) pushing the virtual clay mass inward toward the center of the virtual potter's wheel according to the position and force magnitude of the thumb input and the position and orientation of the first touch sensor in the real space. Similarly, as the user depresses an index finger on the second touch sensor—on the opposite side of the input device—the computer system can update frames of the virtual environment to show a virtual index finger (or second virtual forming tool) contacting the virtual mass of clay, forming a virtual interior wall in the mass of virtual clay spinning on the virtual potter's wheel, and pulling the virtual clay wall outward from the center of the virtual potter's wheel. In this example, as the user depresses a thumb onto the first touch sensor and an index finger on the second touch sensor (i.e., as the user pinches the input device between the first and second touch sensors), the computer system can generate subsequent digital frames of the virtual environment that depict virtual fingers compressing the virtual wall on the potter's wheel according to a measured compressive force applied by the user across the first and second touch sensor surfaces. Furthermore, as the user continues to pinch the input device and to move the input device through an arc in a vertical plane in the real space, the computer system can generate images of the virtual environment depicting virtual fingers compressing the virtual clay wall and drawing the virtual clay wall in an upward direction—corresponding to the arc of the input device in real space—to form a virtual clay vessel spinning on virtual potter's wheel. In particular, as the user articulates the input device upward in real space and pinches the input device between the first and second touch sensors with an increasing compressive force, the computer system can translate this real compressive force on the input device and the motion of the input device into transformation of the virtual clay mass into a virtual clay wall that tapers upwardly toward its top edge to form a virtual clay vessel of height and form related to the distance and trajectory of the arc traversed by the input device. In this example application, once the virtual clay vessel is complete, the computer system can translate the virtual clay vessel into a manufacturing file and upload the manufacturing file to an additive or subtractive manufacturing system or service for recreation in physical material.

1.10 Moving the Virtual Surface

Block S150 of the first method S100 can similarly recite manipulating the virtual surface of the virtual object within the virtual environment according to the first force vector. Generally, in Block S150, the computer system can translate (or rotate) a virtual object within the virtual environment based on a position, direction, and force magnitude of the force vector generated in Block S140.

In one implementation, the computer system projects the force vector onto a point on the virtual surface of the virtual object and then moves the virtual object in three dimensions within the virtual environment according to the magnitude of the first force vector acting on the point on the virtual surface in the direction of the first force vector, such as in the example described above in which the virtual object includes a virtual baseball. The computer system can thus move a virtual object in multiple degrees of freedom within the virtual environment based on a physic or motion model associated with the virtual object. In this implementation, the computer system can also implement methods and techniques described above to temporarily deform the virtual surface of the virtual object—proximal the point on the virtual surface intersected by the force vector—according to the magnitude and direction of the force vector.

In another implementation, Block S150 includes: tracking a position of a touch sensor within a real space; locating a virtual object globally in three dimensions within the virtual environment based on the position of the touch sensor in the real space; translating the virtual object locally along a first axis and a second axis within the virtual environment according to a trajectory of an input moving across the touch sensor surface, wherein the first axis is related (e.g., mapped) to a width (e.g., an X-axis) of the touch sensor surface, and wherein the second axis is perpendicular to the first axis and is related to a height (e.g., a Y-axis) of the touch sensor surface; and translating the virtual object locally along a third axis within the virtual environment according to a force magnitude of the input on the touch sensor surface, the third axis perpendicular to the first axis and the second axis and related to a depth of the touch sensor surface.

In the foregoing implementation, the computer system can thus modulate a Z-position (or a "depth") of the virtual object within the virtual environment—relative to a virtual reference plane corresponding to the touch sensor surface in real space—based on a force magnitude of an input on the touch sensor surface. For example, the computer system can move the virtual object by a first distance in a first direction (e.g., forward away from the user)—relative to the virtual reference plane—in the virtual environment in response to the force magnitude of an input on the touch sensor surface exceeding a threshold force magnitude; in this example, the computer system can calculate the first distance as a function of a difference between the force magnitude of the input (or the magnitude of the force vector) and the threshold force magnitude. Similarly, the computer system can move the virtual object by a second distance in a second direction opposite the first direction (e.g., backward toward the user)—relative to the virtual reference plane—in the virtual environment in response to the force magnitude of the input (or the magnitude of the force vector) falling below the threshold force magnitude; in this example, the computer system can calculate the second distance as a function of the difference between the force magnitude and the threshold force magnitude. Therefore, in this implementation, the computer system can position a virtual object globally within the virtual environment based on the position and orientation of the input device in real space. However, the computer system can move the virtual object in a Z-axis (e.g., normal to a virtual reference plane corresponding to the touch sensor surface) over a smaller distance range based on the magnitude of a force applied to the touch sensor surface, thereby enabling the user to move the virtual object globally within the virtual environment by moving the input device in real space but also enabling the user to offset the virtual object in the virtual environment from the input device in real space along a Z-axis of the input device by modulating a force magnitude of an input applied to the touch sensor surface. Similarly, the computer system can move the virtual object locally over a relatively small distance range in directions parallel to the X- and Y-axes of the virtual reference plane as the input is moved in X- and Y-directions across the touch sensor surface, thereby enabling the user to also offset the virtual object in the virtual environment from the input device in real space along both X- and Y-axes of the input device by moving a finger or stylus across the touch sensor surface. In particular, the computer system can position and orient a virtual object globally within the virtual environment based on the real position of the input device in the real space and shift the location of the virtual object in the virtual environment locally relative to the X-, Y-, and Z-axes of the input device based on changes in the position of an input on the touch sensor surface and the force magnitude of such an input on the touch sensor surface.

In a similar implementation, the computer system can: translate and rotate the virtual object within the virtual environment according to changes in the position and orientation of the touch sensor within the real space; and locally deform a surface of the virtual object at a location corresponding to the position of an input on the touch sensor surface and to a degree related to the force magnitude of the input on the touch sensor surface. In one example, in which the virtual object includes a virtual water balloon, the computer system can: move the virtual water balloon in six degrees of freedom within the virtual environment based on changes in the location and orientation of the input device within the real space; and locally deform (e.g., "squish") the virtual water balloon between two virtual fingers located within the virtual environment according to the location of two discrete inputs on the touch sensor surface and to a degree related to force magnitudes of the two discrete inputs on the touch sensor surface.

1.11 Grasping the Virtual Object

In another implementation in which the input device includes a single touch sensor defining a single substantially flat (e.g., planar) touch sensor surface, the computer system can: translate one or more inputs on the touch sensor surface into a "grasping" or "pinching" gesture of magnitude corresponding to the force magnitude of the input(s); link the position of the virtual object within the virtual environment to the input device in the real space based on the grasping or pinching gesture; and manipulate the virtual object within the virtual environment based on the force magnitude of the input(s) on the touch sensor surface.

For example, in this implementation, the touch sensor can: detect a first input at a first location on the touch sensor surface at a first time; detect a second input at a second location offset from the first input on the touch sensor surface at the first time; and upload these input data to the computer system in the form of a touch image for one scan period. The computer system can then: label the first input and the second input as a "pinch" input in response to the second input moving relatively toward the first input; locate a virtual tool within the virtual environment proximal the virtual object based on the position of the touch sensor at the first time; position two virtual elements (e.g., two virtual fingers, tips of virtual pliers) contiguous with (e.g., extending from) the virtual tool onto opposing sides of the virtual object based on the first location of the first input, the second location of the second input on the touch sensor surface, and the direction of the first force vector in Block S150. In particular, the system can locate the virtual tool globally near the virtual object based on the position of the input device in real space and manipulate the local positions of two (or more) virtual elements on the virtual tool based on the locations of corresponding inputs on the touch sensor surface, including moving the virtual elements together as corresponding inputs on the touch sensor move near one another, as determined by tracking discrete inputs on the touch sensor surface over a sequence of scan periods through touch images received from the touch sensor surface. Furthermore, once the virtual elements contact the virtual object, the computer system can couple the virtual elements and the virtual tool to the virtual object with a firmness related to the force magnitude of one or both inputs on the touch sensor surface (e.g., according to the magnitude of first and/or second force vectors generated for the first and second inputs on the touch sensor surface in Block S140).

In the foregoing implementation, the computer system can then move the virtual object with the virtual tool within the virtual environment according to a change in the position of the touch sensor within the real space while the force magnitude of the first input and/or the force magnitude of the second input remain above a threshold force magnitude. The computer system can also "slip" the virtual object relative to the virtual tool as the force magnitude of the first input and/or the force magnitude of the second input decrease relative to a speed with which the input device is moved throughout the real space. Finally, the computer system can decouple the virtual tool from the virtual object within the virtual environment in response to the force magnitude of the first input and/or the second input falling below the threshold force magnitude. For example, the computer system can implement a threshold force magnitude for grasping the virtual object that is related to a virtual weight of the virtual object such that a heavier virtual object requires inputs of greater force magnitude on the touch sensor surface to grasp the heavier virtual object than a light virtual object. The computer system can thus enable a user to grasp, pinch, or otherwise select, manipulate, and then release a virtual object within the virtual environment by moving the input device within the real space, moving inputs across the touch sensor surface, and modulating the force magnitude of the inputs on the touch sensor surface, and the computer system can control a degree to which the virtual tool is coupled to the virtual object based on the magnitude of a force applied to the touch sensor surface (and represented in a touch image).

In the foregoing implementation, the virtual tool can define a virtual hand, and the virtual elements can define discrete virtual fingers. The computer system can: move the virtual hand within the virtual environment based on changes in the position and orientation of the input device within the real space; move a virtual finger on the virtual hand in adduction and abduction based on a change in the (X,Y) position of an input on the touch sensor surface corresponding to the finger; move the finger to greater degrees of flexion as the force magnitude of the input increases; and move the finger to greater degrees of extension as the force magnitude of the input decreases. The computer system can thus curl virtual fingers around a virtual object to virtually grasp the virtual object in the virtual hand as force magnitudes of inputs corresponding to virtual fingers on the hand increase; and the computer system can release the virtual object from the virtual hand as inputs on the touch sensor surface corresponding to these virtual fingers are withdrawn from the touch sensor surface. In particular, the computer system can: translate and rotate a virtual hand within the virtual environment according to changes in the position and orientation of the touch sensor within the real space; locally move a virtual finger on the virtual hand along a Z-axis of the finger (e.g., flexion and extension) by a distance corresponding to the force magnitude of a corresponding input on the touch sensor surface; and translate the virtual finger on the virtual hand in the X-Y plane of the finger (e.g., adduction, abduction) according to the position of the corresponding input on the touch sensor surface.

The computer system can implement similar methods and techniques to label two (or more) inputs occurring simultaneously on one three-dimensional (e.g., semi-cylindrical or semi-spherical) touch sensor surface or occurring simultaneously on two discrete touch sensors spanning two or more unique planes on the input device as a grasping input. For example, the computer system can articulate virtual fingers on a virtual hand according to positions and force magnitudes of inputs on one or more touch sensors on a cylinder input device, as described below.

For example, the computer system can implement the foregoing methods and techniques to grasp a virtual slingshot in the virtual fingers of a virtual left hand based on the force magnitudes of corresponding inputs on a cylindrical left input device held in a user's left hand (e.g., based on a "grasp" gesture) and to then move the virtual slingshot in the virtual environment based on subsequent positions of the left input device in the real space. In this example, the computer system can move a virtual right hand near a virtual sling on a virtual band coupled to the virtual slingshot held in the virtual left hand based on the position of a cylindrical right input device in real space. Based on the locations and force magnitudes of inputs on one or more touch sensors of the right input device (e.g., based on a "pinch" gesture), the computer system can articulate virtual fingers on the virtual right hand to grasp the virtual sling of the virtual slingshot, as shown in FIG. 3. As the user draws the right input device away from the left input device, the computer system can stretch the virtual band of the virtual slingshot but also increase a threshold force magnitude of the grasp gesture and a threshold force magnitude of the pinch gesture at the right input device required to retain the virtual slingshot in the virtual right and left hands proportional to the distance between the left and right input devices in real space. In particular, if the user does not apply inputs of increasingly greater force magnitudes to the left and right input devices while separating the left and right input devices in physical space to wind the virtual slingshot, the computer system can "slip" the slingshot from the virtual left hand or slip the sling from the virtual right hand if corresponding force magnitudes of inputs on the left and right input devices do not remain above the increasing force magnitude thresholds assigned to the slingshot and to the sling by the computer system. In particular, if the user does not grasp the right input device with an increasing force that remains above the increasing threshold force magnitude of the pinch gesture while drawing the right input device away from the left input device, the computer system can slip the virtual sling from the virtual right hand and fire a virtual projectile from the virtual slingshot at a speed and trajectory corresponding to the relative position of the right input device to the left input device at the slippage time. For example, the computer system can implement a friction model (e.g., a static or kinetic friction model) to define persistence or rigidity of coupling between the virtual right hand and the virtual sling and to define slippage between the virtual right hand and the virtual sling according to the force magnitude of the pinch gesture at the right input device.

However, if the user maintains a suitable force (or pressure) on the left and right inputs devices while separating the left and right input devices to stretch the virtual band of the virtual slingshot, the computer system can preserve a connection between the virtual left hand and the slingshot grip and between the virtual right hand and the virtual sling until the user intentionally releases the pinch gesture from the right input device, at which point the computer system can similarly fire a virtual projectile from the virtual slingshot at a speed and trajectory corresponding to the relative position of the right input device to the left input device within the real space at the time the right input device was released by the user, as shown in FIG. 3. The computer system can implement similar methods and techniques to manipulate a virtual bow and arrow within the virtual environment based on inputs into left and right input devices held by a user and relative positions of these input devices.

In another example, the system can implement similar methods and techniques within a virtual rock climbing environment to grasp a virtual hold with a virtual hand as a user manipulates an input device into a position and orientation in real space corresponding to the virtual hold and then squeezes one or more fingers onto a touch sensor surface of the input device (e.g., a cylindrical touch sensor surface, as described below) to close virtual fingers on the virtual hand around the virtual hold. The computer system can thus: couple the virtual hand to the virtual hold according to a force magnitude with which the user depresses or squeezes the input device; lift a virtual body up a virtual climbing wall as the user moves the input device downward in the real space; and release the virtual hand from the virtual hold when the user releases or withdraws one or more inputs on the touch sensor surface. However, if the force magnitude of inputs on the input device drops below a threshold force magnitude corresponding to a virtual weight of the virtual body or if the force magnitude of inputs on the input device drops or does not increase to a threshold force magnitude before a second virtual hand in the virtual environment is released from another virtual hold, the computer system can "slip" the virtual hold from the virtual hand and drop the virtual body down the virtual climbing wall.

In yet another example, the system can implement similar methods and techniques within a virtual water fight environment to grasp a virtual water balloon with a virtual hand as a user manipulates an input device into a position and orientation in real space corresponding to the virtual water balloon within a basket of virtual water balloons and then squeezes one or more fingers onto a touch sensor surface of the input device (e.g., a cylindrical touch sensor surface, as described below) to close virtual fingers on the virtual hand around the virtual water balloon. However, if the user squeezes the touch sensor surface of the input device with a force magnitude greater than a threshold burst force magnitude, the computer system can virtually burst the virtual water balloon. Similarly, if the user squeezes the touch sensor surface of the input device with a force magnitude less than a threshold holding force magnitude, the computer system can virtually "slip" the virtual water balloon from the virtual hand and onto the ground (and virtually burst the virtual water balloon).

In another example application, the computer system interfaces with the input device to control a virtual toy brick-building environment. In this example application, the computer system generates digital frames of the virtual environment including a virtual brick model and virtual bricks in a virtual brick pile. For example, while holding an input device with the touch sensor surface facing upward, a user can: move the input device over a first position in real space corresponding to the virtual brick pile in the virtual environment; pinch the touch sensor surface of the input device to select a virtual brick from the virtual brick pile; move the input device (with fingers still in contact with the touch sensor surface) to a second position in real space corresponding to the virtual brick model; move fingers to a specific location on the touch sensor surface corresponding to a desired install position for the virtual brick onto the virtual brick model; rotate fingers to set an orientation of the selected virtual brick in a virtual plane corresponding to the orientation of the touch sensor surface in real space; and push downward on the touch sensor surface (or move the input device downward) to install the virtual brick at the selected position on the virtual brick model. The computer system can thus track force values and positions of contact areas on the touch sensor surface, track the position and orientation of the input device within the real space, and update a virtual toy brick-building environment accordingly substantially in real-time 1.12 Manipulating a Virtual Tool In a another example application, the computer system interfaces with the input device to control a virtual sculpting environment, as shown in FIG. 2. In this example application, the computer system generates digital frames of a virtual environment including a virtual mass of clay and virtual clay working tools (e.g., hands, fingers, scrapers, other modeling tools, etc.). In particular, in this example application, the computer system translates a force profile across a contact area of an input object on the touch sensor surface into a virtual clay modeling tool profile that deforms, cuts, and/or drags virtual clay within the virtual environment. For example, the computer system can translate an input passing across a surface of the touch sensor surface along an arc—and varying from a low peak pressure at a first end of the arc to a higher peak pressure near the center of the arc and back to a low peak pressure at a second end of the arc—into a concave relief on a surface of the virtual clay mass by mapping the arc to a virtual surface on the virtual clay mass and then removing (or compressing) virtual clay material within the virtual model along the (virtual) arc according to the input force profile across the touch sensor surface. In this example, if the user contacts the touch sensor surface with a finger, the input device can record a force profile across the finger contact area, including a greatest force near the center of the contact area and decreasing force from the center of the contact area toward the perimeter of the contact area; the computer system can thus remove (or compress) virtual clay material along and perpendicular to the arc based on the force profile of the contact area through a series of consecutive sampling periods. In another example, the computer system transforms an input on a rear (e.g., the second) touch sensor surface of the input device into a stretching or pulling action on a corresponding region of the virtual clay mass, such as by translating a force magnitude on the touch sensor surface into tension on a corresponding point or area of the virtual clay mass along a direction corresponding to the orientation of the input device at the same or similar time (e.g., for an overlapping sampling period). In this example application, the computer system can also push, pull, drag, twist, or otherwise manipulate the virtual clay mass within the virtual environment according to input force magnitudes on the input device and orientations of the input device in real space.

In another example application, the computer system interfaces with the input device to control a virtual painting environment. In this example application, the computer system generates digital frames of a virtual environment including a virtual canvas, virtual paint, virtual paintbrush, and virtual palette and translates a force profile across a contact area of a real paintbrush on the touch sensor surface into controlled collection of paint onto the virtual paintbrush and controlled deposition of paint into the virtual canvas and onto the virtual palette. For example, a user can move the input device to a real position corresponding to the virtual palette within the virtual environment, dab a real paintbrush onto a position on the input device corresponding to a virtual daub of paint on the virtual palette to virtually collect a small amount of virtual paint on the tip of the virtual paintbrush; the computer system can thus map the real position of the touch sensor surface in real space to the virtual palette, map the contact area of the real paintbrush on the touch sensor surface to the daub of paint on the virtual palette, and manipulate the virtual paintbrush within the virtual environment according to the force profile, contact area, and trajectory of the real paintbrush across the touch sensor surface. In this example, the user can also: twist the real paintbrush over a first area of the input device corresponding to a virtual daub of a first paint color on the virtual palette to virtually collect a larger amount of virtual paint on bristles of the virtual paintbrush; dab, swirl, or twist the paintbrush over a second area of the input device to virtually deposit paint of the first color from the virtual paintbrush onto another area of the virtual palette; collect virtual paint of a second color on the virtual paintbrush by moving the real paintbrush over a third area of the touch sensor surface; move the real paintbrush back to the second area to virtually mix the first paint color and the second paint color. In this example, the computer system thus can generate a sequence of digital frames representing the virtual environment and manipulation of the virtual paintbrush and virtual paints according to positions of the input device in real space and inputs on the touch sensor surface over time. Furthermore, once the user has collected virtual paint on the virtual paintbrush, the user can move the input device to a position in real space corresponding to the virtual canvas and then contact the real paintbrush onto the input device; the computer system can thus generate digital frames—substantially in real-time—representing the virtual environment depicting deposition of virtual paint from the virtual paintbrush onto a region of the virtual canvas corresponding to a position of the real paintbrush on the touch sensor surface.

In the foregoing example application, the computer system can also render a virtual environment including a palette knife and can manipulate the palette knife within the virtual environment based on the position and orientation of the input device and a tool (e.g., a real palette knife) on the touch sensor surface. For example, when the input device is held in a position in real space corresponding to the virtual palette, the user can manipulate the orientation of the input device while drawing a real palette knife across a region of the touch sensor surface. The computer system can then: translate changes in the orientation of the input device and the motion and force of the palette knife across the touch sensor surface over a period of time into a corresponding sequence of three-dimensional vectors; and update the virtual environment to depict collection of paint from the virtual palette onto the virtual palette knife—including a twisting motion of the virtual palette knife as it is swept through a virtual daub of paint and then lifted away from the virtual palette knife—based on the sequence of vectors. To virtually deposit paint from the virtual palette knife onto the virtual canvas, the user can then move the input device to a position in real space corresponding to the virtual canvas and place the virtual palette knife in contact with the input device surface; the computer system can track these motions, as described above, and generate new frames representing the virtual environment accordingly substantially in real-time. In this example application, once the canvas is complete, the computer system can translate the canvas into a two-dimensional print file or three-dimensional manufacturing file and upload the file to a printer or to an additive manufacturing system for recreation in physical material.

The computer system can implement similar methods and techniques to control the position and orientation of a scalpel within a virtual surgical environment—such as within a virtual surgical training module—relative to a virtual human body. For example, the computer system can modulate the virtual depth of cut of the virtual scalpel into virtual flesh of the virtual human body with the virtual surgical environment proportional to the magnitude of a force applied to the touch sensor surface and move the virtual scalpel through virtual flesh according to a path traversed by the input device in real space. The computer system can implement similar methods and techniques to position and manipulate a virtual bone saw, a virtual bone drill, and/or any other virtual surgical tool within a virtual surgical environmental.

Therefore, as in the foregoing example applications, the computer system can: virtually couple a virtual tool—representing the input device—to a region of a virtual surface of a virtual object within the virtual environment; orient an axis of the virtual tool within the virtual environment to the direction of a force vector generated in Block S140 according to an input on the touch sensor surface; and interface the virtual tool with the virtual object according to the magnitude of the force vector in Block S150. For example, the computer system can depress the virtual tool (e.g., a virtual clay sculpting tool, as described above) into the virtual surface to a depth related to the magnitude of the force vector. The computer system can also: determine a second position of the input device within the real space at a second time in Block S110; generate a second force vector including a magnitude related to a force magnitude of the first input moved to a second location on the touch sensor surface and a direction related to an orientation of the touch sensor within the real space at the second time in Block S140; locate an origin of the second force vector within the virtual environment based on the second location of the first input and the second position of the touch sensor within the real space at the second time in Block S142; project the second location of the first input on the touch sensor surface onto a second subregion of the virtual surface; orient the axis of the virtual tool to the direction of the second force vector; draw the virtual tool across a length of the virtual surface related to a distance between the first location and the second location; and deform the virtual object over the length of the virtual surface according to the magnitude of the second force vector in Block S150. In the foregoing example, the computer system can draw the virtual tool (e.g., the virtual clay sculpting tool, as described above) through the object according to a trajectory of the input device and a force magnitude of an input on the touch sensor surface throughout this trajectory; the computer system can then remove a corresponding virtual volume of the virtual object or locally deform the virtual surface according to this trajectory and force magnitude(s).

However, the computer system can implement the first method S100 in any other way for any other suitable application between any real space and virtual environment and can interface with the input device to support any other suitable input type or gesture, and the computer system can manipulate the virtual surface and/or the virtual object accordingly in any other suitable way in Block S150. Furthermore, the computer system can execute Blocks of the first method S100 in any other suitable way to link user inputs within physical space (e.g., on the touch sensor surface) to the virtual environment.

1.13 Video Output

One variation of the first method S100 further includes Block S160, which recites serving a sequence of digital frames representing manipulation of the virtual surface of the virtual object within the virtual environment to a virtual reality headset. Generally, in Block S160, the computer system can generate a digital frame representing a state of the virtual environment; the computer system can then serve this digital frame to a user, such as through a virtual reality headset or through an augmented reality heads-up display. For example and as described above, the computer system can generate digital frames representing a user's current field of view of the virtual environment and the current state of the virtual environment—including positions, orientations, and deformation of virtual objects and/or virtual tools manipulated by the user through one or more input devices—at a frame rate of 60 frames per second and serve these digital frames to a two-dimensional or three-dimensional display substantially in real-time. However, the computer system can implement any other method or technique to represent a state of the virtual environment in one digital image and to serve this digital image to a user substantially in real-time.

1.14 Clutching

The computer system can also implement clutching techniques to switch between: a first mode in which a virtual object is moved or manipulated according to motion of the input device and/or forces applied to the touch sensor surface; a second mode in which the virtual object is moved or manipulated according to a different schema when the input device is moved and/or when a force is applied to the touch sensor surface; and a third mode in which the virtual object is not moved or manipulated when the input device is moved and/or when a force is applied to the touch sensor surface. For example, the computer system can switch between a first and a second mode in which the virtual object is manipulated according to two unique schema (e.g., a push schema and a pull schema, a compress schema and a bend schema) based on the total magnitude of force applied to the touch sensor surface. In this example, the computer system can execute the first mode when a total force between 0.1N and 0.5N is applied to the touch sensor surface, execute the second mode when a total force greater than 0.5N is applied to the touch sensor surface, and execute the third mode when a total force less than 0.1N is applied to the touch sensor surface by across all inputs on the touch sensor surface.

In another example, the computing device can switch between modes based on a number of discrete input areas represented in a touch image (e.g., a number of finger tips in contact with the touch sensor surface). For example, the computing device can execute: a first mode in which a real force on the touch sensor surface in translated into a virtual force on a virtual object when a single input area—containing the real force—is detected on the touch sensor surface; a second mode in which the positions of two input areas on the touch sensor surface define a virtual axis of rotation of the virtual object within the virtual environment and in which motion of the input device in real space is translated into motion of the virtual object about the fixed virtual axis of rotation of the virtual object within the virtual environment when exactly two discrete input areas are detected on the touch sensor surface; and a third mode in which the positions of three input areas on the touch sensor surface constrain or "lock" the virtual position of the virtual object to the real position of the input device such that the virtual object is moved in the virtual environment according to changes to the position and orientation of the input device in real space when exactly three discrete input areas are detected on the touch sensor surface.

In the foregoing example, the computer system can also implement a static or kinetic friction model (e.g., a static or kinetic friction coefficient for a virtual surface of a virtual object) to define a strength of a connection between an input area on the touch sensor surface and a virtual point or virtual surface on a virtual object in the virtual environment based on a magnitude of a force applied within this input area. For example, the computer system can "slip" a connection between a virtual object and an input area on the touch sensor surface inversely with the magnitude of force applied to the touch sensor surface within this input area according to a friction model. In this example, when a force is applied to each touch sensor surface on opposing sides of the input device to manipulate a virtual tool within the virtual environment, the computer system can slip a virtual object relative to the virtual tool according to a friction model in response to a sum of a first force magnitude of a first input on the first touch sensor surface and a second force magnitude of a second input on the opposite touch sensor surface falling within a force magnitude range between an upper threshold force magnitude (in which the virtual object is locked to the virtual tool) and a lower threshold force magnitude (in which the virtual object is released from the virtual tool).

In yet another example in which the input device includes a first touch sensor surface on a first side and a second touch sensor surface on an opposing side, as described below, the computer system can execute: a first mode in which a virtual object or virtual surface is translated within the virtual environment according to a real force applied to the first touch sensor surface within an input area when no other input area is detected on the first or second touch sensor surface; a second mode in which the virtual object is rotated within the virtual environment about a virtual axis defined by the positions of a first input area on the first touch sensor surface and a second input area on the second touch sensor surface and by a speed or magnitude corresponding to the force magnitudes applied to the first and second input areas when only the first and second input areas are detected on the first and second touch sensor surfaces. Alternatively, in the second mode, the computer system can: couple a first input area on the first touch sensor surface to a corresponding point on one side of the virtual object based on a friction model and the force magnitude of the first input area; couple a second input area on the second touch sensor surface to a corresponding point on the opposite side of the virtual object based on the friction model and the force magnitude of the second input area; and apply shear forces to the virtual object as the first and second input areas move across the first and second touch sensor surfaces, respectively, based on a strength of coupling between the first and second inputs areas and their corresponding points on the virtual object, thereby rotating the virtual object in the virtual environment.

However, the computer system can implement any other methods and techniques to switch between modes to control and release a virtual object or virtual surface based on one or more inputs into the input device.

2. Second Method

Figure 5:
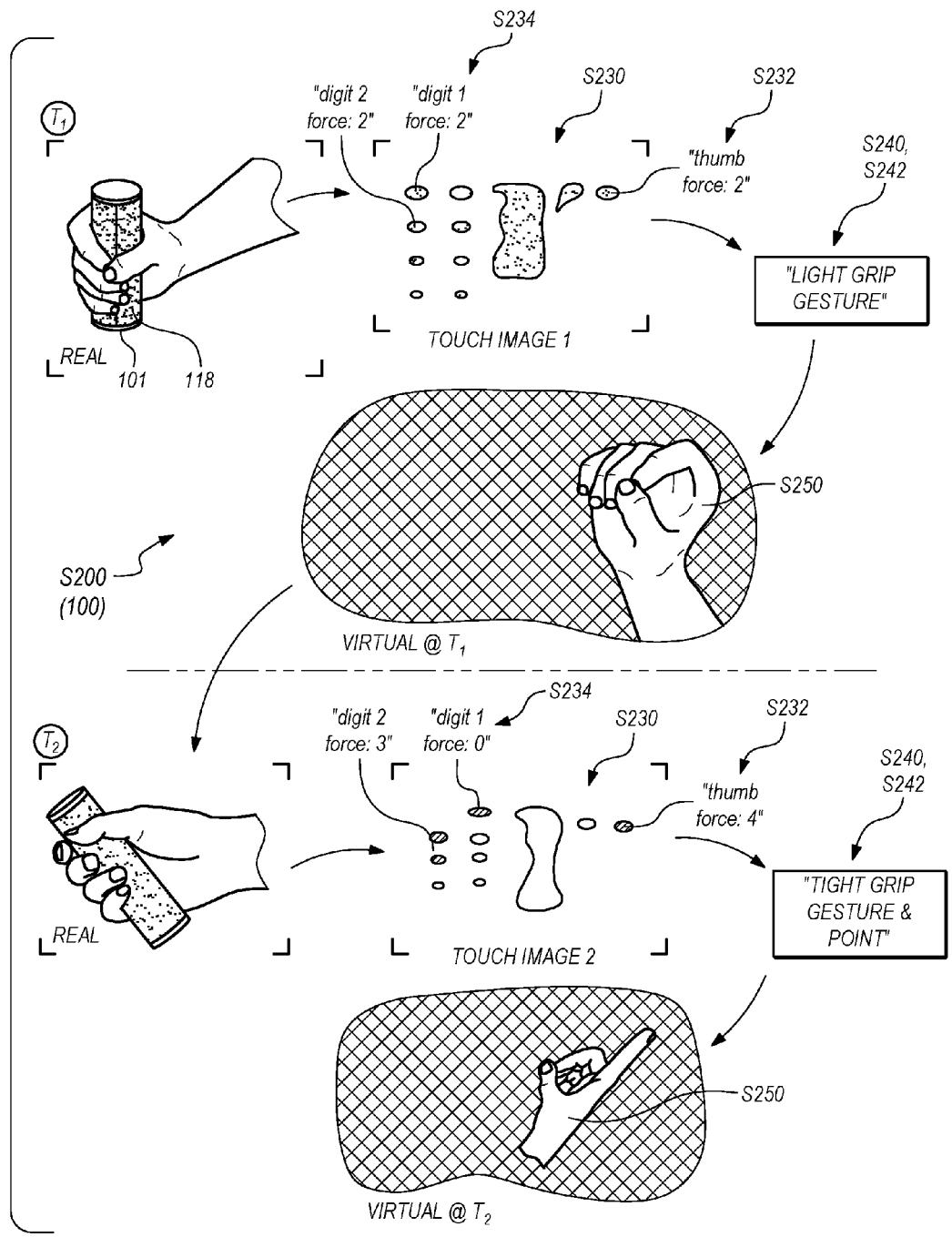
FIG. 5 is a flowchart representation of one variation of the second method.

As shown in FIG. 5, a second method includes: receiving a touch image from a handheld device, the touch image including representations of discrete inputs into a touch sensor integrated into the handheld device in Block S230; extracting a first force magnitude of a first input at a first location on a first side of the handheld device from the touch image in Block S232; extracting a second force magnitude of a second input at a second location on a second side of the handheld device from the touch image in Block S234, the second side of the handheld device opposite the first side of the handheld device; transforming the first input and the second input into a gesture in Block S240; assigning a magnitude to the gesture based on the first force magnitude in Block S242; and manipulating a virtual object within a virtual environment based on a type and the magnitude of the gesture in Block S250.

2.1 Applications

Generally, the second method can be executed by the computer system described above, such as in conjunction with the first method S100, to characterize multiple discrete inputs on one or more touch sensor surfaces of an input device as a gesture and to manipulate a virtual object within a virtual environment based on the gesture. In particular, the computer system can interface with an input device (e.g., a cylindrical handheld device including a cylindrical touch sensor with cylindrical touch sensor surface, such as described below) to receive force magnitude and position data of multiple inputs spanning multiple planes or distinct surfaces of the input device, to interpret these inputs as a gesture, to define a magnitude of the gesture based on force magnitudes of these inputs on the touch sensor, to track the position and orientation of the input device within the real space, and to manipulate a virtual surface or a virtual object according to the gesture, the magnitude of the gesture, and the position of the input device in real space.

Figure 7:
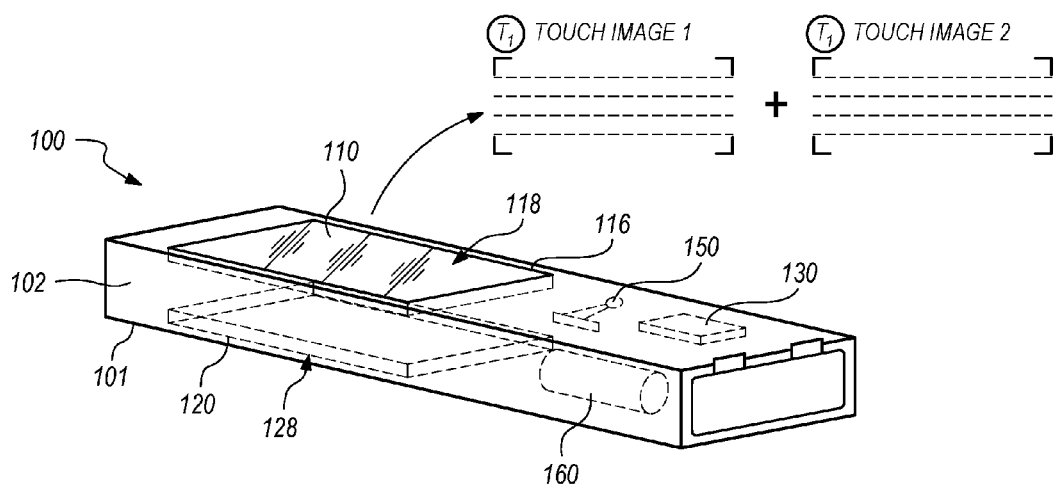
FIG. 7 is a flowchart representation of one variation of the system.

For example, the computer system can interface with an input device 101 including one substantially planar touch sensor on a front of the input device (e.g., to face a user's thumb when held) and a second substantially planar touch sensor on a back of the input device (e.g., to face the user's fingers when held), as shown in FIG. 7. Alternatively, the computer system can interface with an input device including a single touch sensor wrapped, bent, or otherwise formed into a three-dimensional structure, such as a cylinder or approximate sphere, spanning multiple distinct planes. The computer system can then implement Blocks of the second method to: identify a primary input among multiple discrete inputs detected on the input device at one instance in time; to detect a multi-fingered grasping gesture at the input device; to manipulate virtual fingers on a virtual hand within the virtual environment; to detect a bending gesture at the input device; or to detect a twisting gesture at the input device; etc.

2.2 Touch Image

Generally, in Blocks S230, S232, and S234, the computer system can implement methods and techniques described above to: receive a touch image from the input device (or one touch image for each discrete touch sensor integrated into the input device); to identify multiple discrete inputs on the input device from the touch image(s); and to calculate a peak force, a total force, and/or an input area for each input on the input device at a time corresponding to the touch image(s). For example, the computer system can identify values within a touch image exceeding a static or dynamic baseline value and label each cluster of values in the touch image—exceeding (or exceeded by) the baseline value with a perimeter bounded by a value substantially equivalent to the baseline value and/or by an edge of the touch image—as a discrete input. For each discrete input, the computer system can then: calculate an area of the discrete input based on a known pitch between sense elements in the input device or by a known area of the touch sensor and the boundary of the input in the touch image; identify a peak (or minimum) value within the boundary of the input in the touch image; and sum all values within the boundary of the input in the touch image to calculate a total force of the discrete image.

Furthermore, for the input device that includes multiple touch sensors that each output one touch image per scan period, the computer system can repeat this process for each touch image corresponding to one scan period to identify multiple inputs across multiple touch sensor surfaces of the input device during the scan period. However, the computer system can implement any other methods or techniques in Blocks S230, S232, and S234 to identify discrete inputs on the touch sensor surface of the input device at an instant in time based on a touch image received from the input device and corresponding to the same instant in time.

2.3 Prioritizing Inputs

In one implementation, the computer system identifies a set of distinct inputs on the input device and identifies a primary or "intended" input in the set of inputs based on differences in force magnitudes of these inputs. In one example, the computer system: extracts a first force magnitude of a first input (e.g., a thumb) at a first location on the first side of the input device from the touch image in Block S232; extracts a second force magnitude of a second input (e.g., an index finger) at a second location on the second side of the input device from the touch image in Block S234; and extracts a third force magnitude of a third input (e.g., a middle finger) at a third location on the second side of the input device from the touch image in Block S234, thereby identifying and characterizing multiple discrete inputs on the input device in one instance of time. In this example, the computer system then: labels the first input as an intended input if the first force magnitude approximates the sum of the second force magnitude and the third force magnitude and if the second force magnitude and the third force magnitude are substantially similar in magnitude; label the second input and the third input as secondary or "holding" inputs representing inputs on the input device stemming from the user holding the input device; and discard the second input and the third input accordingly. Once the first input is labeled as an intended input, the computer system can generate a gesture corresponding to a command assigned to a region of the handheld device including the first location, such as a selection gesture for the command, in Block S240, and write a magnitude (e.g., a degree from 1-10, a proportion from 0-100%, or a scalar value) to the gesture based on the first force magnitude in Block S242. Finally, the computer system can transform, modify, move, or otherwise manipulate a virtual object within the virtual environment according to the gesture according to the magnitude assigned to the gesture (e.g., by executing the command to a degree related to the first force magnitude).

In a similar example, the computer system can interpret a first input applied by an index finger to the input device as a primary input corresponding to pulling a virtual trigger: if the peak force magnitude of the first input exceeds the peak force magnitude of a second input corresponding to the user's palm contacting an opposite side of the input device; and if the total force magnitude of the first input approximates the total force magnitude of the second input. The computer system can then move a virtual trigger on a virtual gun by a distance corresponding to the peak force magnitude of the first input and fire the virtual gun only once the peak force magnitude of the first input exceeds a threshold force magnitude.

However, the computer system can implement any other method, technique, or schedule to label one or multiple inputs on the input device as a primary input, to respond to this primary input by modifying or manipulating a virtual object within the virtual environment, and to discard other secondary inputs on the input device.

2.4 Grasping a Virtual Object

In another implementation, the computer system implements methods and techniques similar to those described above to interpret multiple inputs on the input device as a grasping or clamping gesture. For example, the computer system can: transform a first input on a first side of the input device and a second input on the opposite side of the input device—represented in a touch image—into a grasping gesture based on coaxial proximity of the first location of the first input and the second location of the second input through the handheld device. In particular, the computer system can label two (or more) inputs—such as corresponding to a user's index finger and thumb—of similar force magnitudes detected on opposing sides of the input device as a grasping gesture if the first and second locations of the first and second inputs are substantially aligned in a horizontal and vertical plane passing through an axis of the input device, as shown in FIG. 3.

The computer system can then: write a grasping magnitude related to a sum of the first force magnitude of the first input and the second force magnitude of the second input to the grasping gesture; couple a virtual tool in the virtual environment to the virtual object according to the grasping magnitude of the grasping gesture, such as described above; move the virtual object—grasped by the virtual tool—throughout the virtual environment according to motion of the input device within the real space while the grasping magnitude exceeds a threshold magnitude; and then release the virtual object from the virtual tool once the grasping magnitude drops below the threshold magnitude. In particular, the computer system can: track the position of the input device within the real space, as in Block S220 described above; move the virtual object (and a virtual tool coupled to the virtual object according to a grasping or pinching gesture) within the virtual environment according to a change in the position of the input device within the real space while the sum of the first force magnitude of the first input on the first side of the input device and the second force magnitude of the second input on the second side of the device exceeds a threshold force magnitude; and then decouple the virtual tool from the virtual object within the virtual environment in response to the sum of the first force magnitude of the first input and the second force magnitude of the second input falling below the threshold force magnitude.

In one example implementation in which the input device includes a first touch sensor surface on one side of the input device and a second touch sensor surface on an opposite side of the input device, the computer system can map the first touch sensor surface to a first region of a virtual surface of a virtual object represented in the virtual environment, and the computer system can map the second touch sensor surface to a second region of a virtual surface of the virtual object opposite the first region of the virtual surface. In this example implementation, the input device can output a first touch image for the first touch sensor surface and a second touch image for the second touch sensor surface. Thus, when a pair of first and second touch images for a scan period indicate that the user is pinching the first and second touch sensor surfaces of the input device (e.g., between a thumb and index finger), the computer system can compress the first and second regions of the virtual object in the virtual environment toward one another based on the magnitudes of the corresponding forces on the first and second touch sensor surfaces. In this example implementation, if subsequent touch image pairs indicate that the user is pinching and dragging his thumb and index finger along first and second touch sensor surfaces of the input device, the computer system can update the first and second regions of the virtual object in the virtual environment to reflect compression of the first and second regions toward one another along a virtual arc representing the real trajectory of the user's thumb and index finger across the input device. Furthermore, while the sum of the first and second force magnitudes exceeds a threshold force magnitude corresponding to a virtual weight of the virtual object, the computer system can update the position and orientation of the virtual object within the virtual object environment according to the position and orientation of the input device in real space, as described above.

2.5 Virtual Hand Control

In another implementation, the computer system implements methods and techniques similar to those described above to interpret multiple inputs on the input device as positions of virtual fingers on a virtual hand in the virtual environment. In one example implementation in which the computer system interfaces with a cylindrical input device, as described below, the computer system can: identify a set of discrete input areas in the touch image received from the cylindrical input device; and then label each discrete input area in the set of discrete input areas as one of a palm, a first digit, a second digit, a third digit, a fourth digit, and a fifth digit of a user's hand based on relative positions of each discrete input area represented in the touch image and a digital human hand model stored locally on the computer system in Blocks S230, S232, and S234, as shown in FIG. 5. The computer system can then generate a gesture defining adduction and abduction positions of each virtual finger of a virtual hand model based on locations and labels of each discrete input area in the set of discrete input areas in Block S240; specifically, the computer system can update the lateral positions of virtual fingers on a virtual hand model to align to the real positions of fingers detected on the touch sensor surface(s) of the input device. The computer system can also augment the gesture with a magnitude of flexion of each virtual finger of the virtual hand model based on a force magnitude of each discrete input area in the set of discrete input areas detected on the input device; specifically, the computer system can transform the force magnitude of each discrete input area on the touch sensor surface labeled as representing a finger into a degree of flexion in Blocks S240 and S242. For example, the computer system can define the position of a virtual finger in the virtual hand model: from a position of neutral extension (e.g., a straight finger) when a baseline force is represented in the touch image at an expected position of the user's corresponding finger (or when a minimum force representing the user's corresponding finger just grazing the touch sensor surface is contained in the touch image); to full flexion of the virtual finger when a preset maximum force is represented in the touch image at the position of the user's finger corresponding to the virtual finger; the computer system can repeat this for each virtual finger of the virtual hand model. Once the computer system populates the gesture with the position of each virtual finger for the virtual hand model based on the position and force magnitude of each finger on the input device, the computer system can transform a virtual hand model within the virtual environment according to the adduction and abduction positions and magnitudes of flexion defined in the gesture; specifically, the computer system can update the adduction, abduction, flexion, and extension positions of each virtual finger of the virtual hand within the virtual environment to represent the adduction position, abduction position, and compressive force of each of the user's fingers on the input device.

2.6 Bending the Virtual Object

In yet another implementation, the computer system implements methods and techniques similar to those described above to interpret multiple inputs on the input device as a bending gesture to virtually bend a virtual object in the virtual environment. In one implementation in which the computer system interfaces with a planar input device including a first planar touch sensor on one side of the input device and a second planar touch sensor on an opposite side of the input device, the computer system: extracts a first force magnitude of a first input (e.g., a thumb) at a first location on the first side of the input device from the touch image in Block S232; extracts a second force magnitude of a second input (e.g., an index finger) at a second location on the second side of the input device from the touch image in Block S234; and extracts a third force magnitude of a third input (e.g., a middle finger) at a third location on the second side of the input device from the touch image in Block S234, thereby identifying and characterizing multiple discrete inputs on the input device in one instance of time, such as described above. The computer system can then transform these three inputs into a bending gesture input according to lateral separation between the second location of the second input and the third location of the third input on the second side of the input device that spans the first location of the first input on the first side of the input device in Block S240. The computer system can also assign a magnitude of a bending moment to the gesture based on the first force magnitude, the second force magnitude, and the third force magnitude, such as by defining a virtual bending moment corresponding to the first force magnitude (which may approximate the sum of the second force magnitude and the third force magnitude), in Block S242. Finally, the computer system can virtually bend the virtual object in the direction of the bending moment and to a degree corresponding to the magnitude of the bending moment as defined in the bending gesture.

Figure 4:
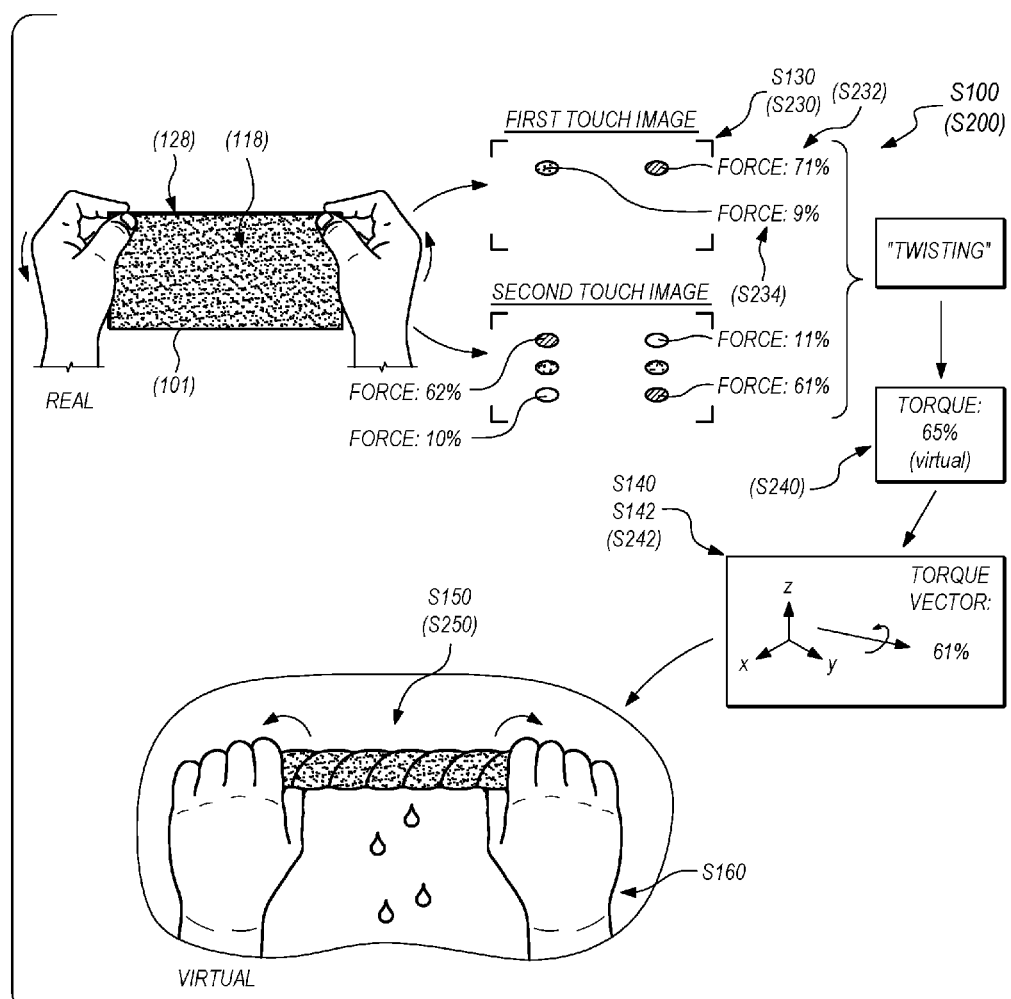
FIG. 4 is a flowchart representation of one variation of the first method and one variation of the second method.

In one example application in which the input device includes a first touch sensor surface and a second touch sensor surface, as described above, the computer system can detect bending and torque inputs into the input device based on touch image pairs for the first and second touch sensor surfaces and modify the virtual object accordingly. For example, the computer system can: correlate a first force applied near the center of the first touch sensor surface, a second force applied near a right edge of the second touch sensor surface, and a third force applied near a left edge of the second touch sensor surface with a concave bending input; map a plane in the real space parallel to the first and second touch sensor surfaces onto a virtual reference plane intersecting the virtual object within the virtual environment based on the position and orientation of the input device; and deform the virtual object out of the virtual reference plane according to the magnitude of the concave bending input. In another example, the computer system can: correlate a first force applied near a top-right corner of the input device at the first touch sensor surface, a second force applied near the bottom-right corner of the input device at the second touch sensor surface, a third force applied near a bottom-left corner of the input device at the first touch sensor surface, a second force applied near the top-left corner of the input device at the second touch sensor surface with a torque input (or a "twisting gesture") about a lateral axis of the input device; map the lateral axis onto a virtual axis intersecting the virtual object within the virtual environment based on the position and orientation of the input device; and twist the virtual object (e.g., a virtual wet rag) about the virtual axis according to the magnitude of the torque input, as shown in FIG. 4.

In a similar example application, the computer system interfaces with the input device to control a virtual Rubik's cube. In particular, in this example application, the computer system generates digital frames of a virtual brick model and virtual bricks in a virtual brick pile. For example, the user can rotate the input device about three axes, and the computer system can correlate the orientation of the input device with one of three dimensions of the virtual Rubik's cube for subsequent manipulation. The user can then translate the input device between three discrete position ranges along the axis with which the input device is currently oriented, and the computer system can correlate the position of the input device along the selected axis with one of three virtual rows of the virtual Rubik's cube for subsequent manipulation. The user can then place two (or more) fingers on the touch sensor surface and then rotate these fingers over the touch sensor surface; the computer system can map this input motion into rotation of the selected virtual row of the virtual Rubik's cube while holding the remaining two rows of the virtual Rubik's cube static within the virtual environment. The computer system can update the virtual environment accordingly substantially in real-time.

2.7 Detecting Inputs on Unsensed Areas of the Input Device

In another implementation, the computer system implements methods and techniques similar to those described above to transform inputs on a touch sensor surface represented in a touch image into determination of an input (e.g., a finger depressing) contacting an unsensed surface (i.e., a surface not containing a touch sensor, moment switch, or other contact or proximity sensor) of the input device. For example, when a user holding a cylindrical input device between his palm and four fingers depresses the top of the cylindrical input device—excluding a touch sensor or other sensor—with a thumb, the user may also grasp or "squeeze" the cylindrical input device between his thumb and fingers to a greater degree to prevent the input device from slipping from his grasp. However, depression of the top surface of the input device may still cause the input device to shift slightly downward in the user's hand, which may cause contact areas of the user's fingers on the touch sensor surface to move (or "roll") upward relative to the touch sensor surface. The grasping force applied by the user may then decrease and the position of the user's fingers on the touch sensor surface may return to previous lower relative positions once the user's releases his thumb from the top of the input device. The computer system can thus interpret this sequence—including increases in peak or total force magnitude applied by each finger to the touch sensor surface and upward shifts in input area positions followed by decreases in peak or total force magnitude applied by the user's fingers and downward shifts in input area positions on the touch sensor surface—as an input on the top of the input device.

Therefore, as in the foregoing example implementation in which the input device defines a cylindrical (or otherwise three-dimensional) touch sensor surface, the computer system can: track a first input on a first side of the input device and a second input on a second side of the input device across a sequence of touch images in Blocks S230 and S232; and then interpret increases in force magnitudes of the first input and the second input, an upward shift in the first location of the first input, and an upward shift in the second location of the second input across the sequence of touch images as a third input on a unsensed surface of the input device above and substantially perpendicular to the first side and to the second side of the handheld device. For example, the computer system can implement blob detection techniques to identify one discrete input area in one touch image and to match this discrete input area in a subsequent touch image, calculate the centroid of the input area in each touch image, calculate a distance between centroids of the discrete input area across the two touch images, and repeat this process over subsequent touch images to track movement of the corresponding input on the input device over time. The computer system can also implement methods and techniques described above to calculate a peak or total force magnitude on the discrete input area over the sequence of touch images and then implement an unsensed area input model or template to characterize this sequence of force magnitude change and input area location change events as a single input on the unsensed top of the input device.

In the foregoing implementation, the computer system can also: label the third input on the unsensed top of the input device as an intended input on the input device, discard the first input and the second input represented in the sequence of touch images, and generate a gesture corresponding to a command assigned to the top unsensed area of the input device in Block S240; and assign a third force magnitude to the third input on the unsensed top of the input device based on the force magnitudes of the first input and the second input, a magnitude of the upward shift in the first location of the first input, and/or a magnitude of the upward shift in the second location of the second input in Block S242. For example, the computer system can relate the total force magnitudes of the first and second inputs on the touch sensor surface and the maximum displacement distance of the first or second input during application of the user's thumb on the top of the input device to a total force magnitude of the user's thumb on the top of the input device. Finally, the computer system can manipulate the virtual object within the virtual environment according to the location and force magnitude of this input on the input device. For example, the computer system can select the virtual object within the virtual environment according to the command assigned to the top of the input device if the estimated force magnitude of this input exceeds a threshold force magnitude.

3. Input Device

Figure 8:
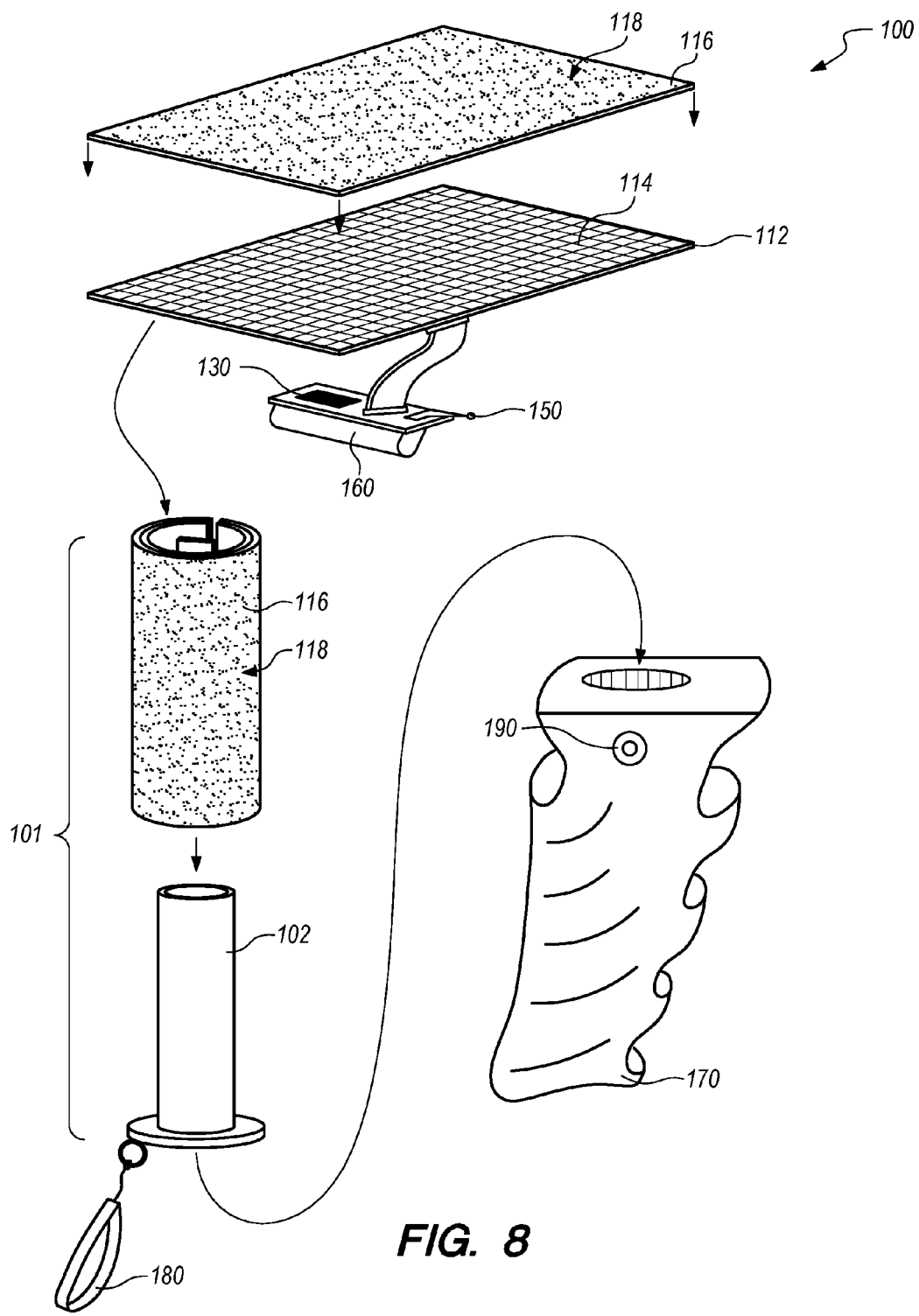
FIG. 8 is a flowchart representation of one variation of the system.
Figure 9:
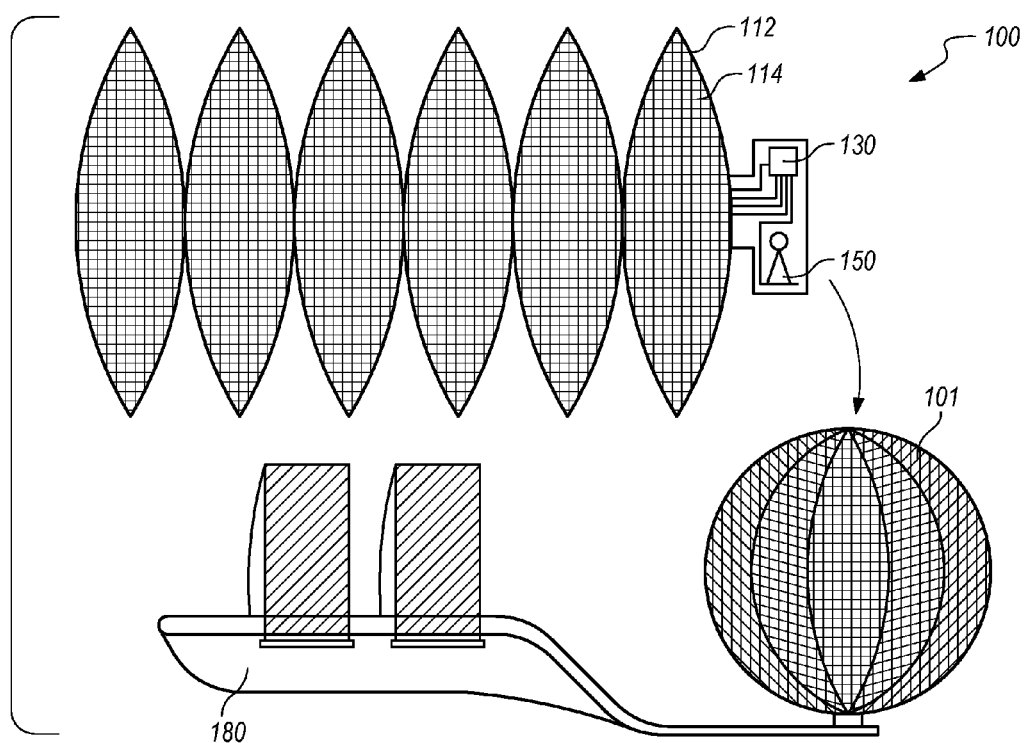
FIG. 9 is a flowchart representation of one variation of the system.

As shown in FIGS. 7, 8, and 9, a system 100 for manipulating virtual objects within a virtual environment includes: a housing 102; a first touch sensor no; a second touch sensor 120; and a controller 130. The first touch sensor includes: a first touch sensor surface 118 extending across a first region of the exterior of the housing 102; a first array of sense electrodes 114 patterned across a substrate 112; and a first resistive layer 116 interposed between the first touch sensor surface 118 and the first array of sense electrodes 114, in contact with the first array of sense electrodes 114, and including a material exhibiting variations in local electrical resistance responsive to variations in force applied to the first touch sensor surface 118. The second touch sensor 120 includes: a second touch sensor surface 128 extending across a second region of the exterior of the housing 102 opposite the first region; a second array of sense electrodes 122; and a second resistive layer 126 interposed between the second touch sensor surface 128 and the second array of sense electrodes 122, in contact with the second array of sense electrodes 122, and including the material. The controller 130 is coupled to the housing and is configured to: scan the first array of sense electrodes 114 and the second array of sense electrodes 122 during a scan period; detect a first input of a first force magnitude at a first location on the first touch sensor surface 118 based on a change in resistance values of a subset of sense electrodes in the first array of sense electrodes 114; detect a second input of a second force magnitude at a second location on the second touch sensor surface 128 based on a change in resistance values of a subset of sense electrodes in the second array of sense electrodes 122; and generate a touch image defining the first location and the first magnitude of the first input and the second location and the second magnitude of the second input for the scan period.

3.1 Applications

Generally, the system 100 includes an input device, as described above, that includes one or more touch sensors that detect positions and force magnitudes of inputs on one or more touch sensor surfaces, that packages the positions and force magnitudes of inputs on the touch sensor surface(s) into one touch image per scan period; and that uploads these touch images to a computer system, such as described above, for processing to manipulate virtual objects within a virtual environment. For example, the system 100 (hereinafter "input device") can define a handheld device that a user may depress, squeeze, twist, bend, shake, move, or otherwise manipulate in real space with one or two hands, and the input device 101 can package inputs on the touch sensor surface(s) into touch images and upload these touch images to a local virtual reality system—including the computer system—substantially in real-time. In this example, the computer system can then implement the first method S100 and/or the second method S200 described above to track the input device 101 in real space, to define gestures based on the position of the input device 101 in real space and inputs represented in one or a sequence of touch images, and to manipulate virtual objects within a virtual environment according to such gestures.

3.2 Touch Sensor

As shown in FIGS. 7, 8, and 9, the input device 101 includes one or more touch sensors, wherein each touch sensor includes: an array of sense electrode and drive electrode pairs (i.e., sense electrodes, or "sense elements") patterned across a substrate (e.g., a fiberglass PCB, a flexible PCB); and a resistive layer arranged over the substrate in contact with the sense electrode and drive electrode pairs, defining a material exhibiting variations in local bulk resistance and/or local contact resistance responsive to variations in applied force, and defining a touch sensor surface opposite the substrate. As described in U.S. patent application Ser. No. 14/499,001, the resistive touch sensor can include a grid of drive electrodes and sense electrodes patterned across the substrate. The resistive layer can span gaps between each drive and sense electrode pair across the substrate such that, when a localized force is applied to the touch sensor surface, the resistance across an adjacent drive and sense electrode pair varies proportionally (e.g., linearly, inversely, quadratically, or otherwise) with the magnitude of the applied force. As described below, the controller can read resistance values across each drive and sense electrode pair within the touch sensor and can transform these resistance values into a position and magnitude of one or more discrete force inputs applied to the touch sensor surface.

3.3 Controller

The input device 101 also includes a controller 130 that detects the first input on the first touch sensor surface based on a change in measured resistance across sense electrodes and drive electrodes in the subset of sense electrode and drive electrode pairs and determines a force magnitude of the first input based on a magnitude of the change in measured resistance across sense electrode and drive electrodes in the subset of sense electrode and drive electrode pairs. Generally, the controller functions to drive the touch sensor, to read resistance values between drive and sense electrodes during a scan cycle, to transform resistance data from the touch sensor into locations and magnitudes of force inputs over the touch sensor surface, and to package these data in one touch image per scan cycle, as shown in FIGS. 1 and 3-7. The controller can also execute Blocks of the first method S100 and the second method S200 described above locally to transform locations and/or force magnitudes of inputs on the touch sensor(s) detected over one or more scan cycles into a gesture or other command and to output values of this gesture or command to a local computer system; the computer system can then execute other Blocks of the first method S100 and the second method S200 described above to manipulate a virtual object within a virtual environment according to this gesture or command.

In one implementation, the controller includes: an array column driver (ACD); a column switching register (CSR); a column driving source (CDS); an array row sensor (ARS); a row switching register (RSR); and an analog to digital converter (ADC); as described in U.S. patent application Ser. No. 14/499,001. In this implementation, the touch sensor can include a variable impedance array (VIA) that defines: interlinked impedance columns (IIC) coupled to the ACD; and interlinked impedance rows (IIR) coupled to the ARS. During a resistance scan period: the ACD can select the IIC through the CSR and electrically drive the IIC with the CDS; the VIA can convey current from the driven IIC to the IIC sensed by the ARS; the ARS can select the IIR within the touch sensor and electrically sense the IIR state through the RSR; and the controller can interpolate sensed current/voltage signals from the ARS to achieve substantially accurate detection of proximity, contact, pressure, and/or spatial location of a discrete force input over the touch sensor for the resistance scan period within a single sampling period.

3.4 Optical Fiducials and Wireless Transmitter

In one variation shown in FIG. 8, the input device 101 also includes an optical emitter 140 coupled to the housing and configured to broadcast an optical signal detectable by an external tracking system to determine the position and orientation of the housing within a real space. In particular, the input device 101 can include a passive or active optical fiducial 140, such as an infrared reflector or optical emitter 140, that interfaces with an external tracking system to enable the computer system to track the position of the input device 101 in real space, as described above. (Alternatively, this input device 101 can include an optical detector and can track its position and orientation in real space based on infrared or other light signals received from static optical emitters placed in the real space and then upload its position and orientation to the computer system, such as via a wireless transmitter 150 described below.)

In an implementation in which the input device 101 is a wireless, self-contained handheld device that interfaces with a remote computer system to control a virtual environment, the input device 101 can also include a wireless transmitter 150 (or wireless transceiver) arranged within the housing and configured to transmit touch images to the computer system, such as over short-range wireless communication protocol, as shown in FIG. 8. Alternatively, the input device 101 can be wired to the computer system and can upload touch images to the computer system substantially in real-time over wired communication protocol. As described above, the input device 101 can further include one or more motion sensors, such as an accelerometer, gyroscope, and/or magnetometer, and can upload motion data to the computer system with each touch image; the computer system can then manipulate these sensor data to track the input device 101 in real space over time.

3.5 Single-faceted Input Device

In one variation, the housing defines a rectangular body, and the input device 101 includes a single touch sensor no defining a planar touch sensor surface 118 on one side of the housing 102. For example, the housing 102 can include a rectilinear, plastic injection-molded body or a machined aluminum housing. Similarly, the input device 101 can include a single touch sensor 110 integrated into an ergonomic housing 102, as shown in FIG. 6.

3.6 Multi-faceted Input Device

In another variation shown in FIG. 7, the housing 102 defines a rectilinear body and the input device 101 includes two touch sensors, including a first touch sensor defining a first planar touch sensor surface across the front (or top) of the housing 102 and a second touch sensor defining a second planar touch sensor surface across the bottom front (or back) of the housing 102 opposite the first touch sensor surface. In this variation, the first and second touch sensors can be discrete, wherein each touch sensor includes its own discrete substrate and is paired with its own dedicated controller.

In a similar variation, the input device 101 includes one touch sensor that defines two touch sensor surfaces each spanning a unique plane of the housing 102. For example, the input device can include a touch sensor fabricated on a flexible PCB, and the touch sensor can be bent, folded, or otherwise formed into a three-dimensional structure that, when installed in the housing 102, spans two opposing sides (and one or more intermediate sides) of the housing 102, such as the front and back (and one or both sides) of the housing 102. For example, substrate of the touch sensor can include a cross-shaped flexible PCB that can be folded into a three-dimensional rectilinear structure and installed over five of six planar sides of the housing 102 and fastened to these sides of the housing 102, such as with an adhesive or mechanical fastener; a resistive layer, such as in the form of a sleeve that can then be installed over the flexible PCB and the housing 102 to complete the touch sensor. A cover layer can be integrated into the sleeve over the resistive layer to define a continuous touch sensor surface across the five sensible sides of the housing 102.

The controller 130, the transmitter 150, and a battery 160 can then be installed in the housing 102 via the sixth side (e.g., the bottom) of the housing 102 to complete the input device 101. The input device can thus include one controller that outputs one touch image representing locations and force magnitudes of inputs on the five sensible sides of the housing 102 per scan cycle. The computer system can thus implement a model of sense element locations across the sides of the housing 102 to partition a two-dimensional touch image (e.g., a two-dimensional matrix) into one discrete touch image per side of the three-dimensional housing. Furthermore, upon receipt of a sequence of touch images from the input device 101, the computer system can execute Blocks of the second method S200 described above to identify and characterize inputs on the sixth side of the input device 101 based on locations and force magnitudes of inputs on the five sensible sides of the housing 102 represented in the sequence of touch images. However, the touch sensor can be fabricated and formed into a three-dimensional structure that spans any other two or more sides of the housing 102 to define multiple touch sensor surfaces spanning multiple unique planes of the housing 102.

3.6 Cylindrical Input Device

In another variation shown in FIG. 8, the housing 102 defines a cylindrical section, and the first touch sensor surface and the second touch sensor surface define a contiguous touch sensor surface spanning a cylindrical surface of the housing 102. Generally, in this variation, the housing 102 defines a cylindrical section, and the touch sensor defines a cylindrical touch sensor surface extending over all or a portion of the cylindrical section of the housing 102. For example, the housing 102 can include a rigid cylindrical section—such as a plastic injection-molded, aluminum die cast, or extruded aluminum tube—open on one or both ends. As in the foregoing variation, the substrate of the touch sensor can include a flexible PCB; once an array of drive and sense electrodes are patterned across the flexible PCB, the resistive layer can be applied over the array of drive and sense electrodes, and a cover layer can be applied over the resistive layer to form a closed, self-contained touch sensor. The touch sensor can then be wrapped around and fixed to the housing 102, such as with an adhesive or mechanical fastener. Alternatively, the substrate, array of drive and sense electrodes, and resistive layer can be installed over the housing 102, and the housing 102 and touch sensor assembly can be stuffed into a cover sleeve, such as a flexible silicone sleeve or a heat-shrink tube, to close the touch sensor and to fix the touch sensor to the housing 102. Similarly, the resistive layer can be integrated into the clover sleeve, as described above. The controller 130, the transmitter 150, and a battery 160 can then be installed in one open end of the housing 102 and closed with a cover to complete the input device 101.

Therefore, the input device 101 can include multiple touch sensor sections (e.g., columns of sense elements that span the height of the housing 102) fabricated on one common substrate that can be formed around multiple sides of a housing or across a non-planar (e.g., cylindrical) surface of a housing, and these multiple touch sensor sections can share one common controller.

3.7 Spherical Input Device

In yet another variation shown in FIG. 9, the input device 101 defines a spherical form. For example, the substrate of the touch sensor can include a flexible PCB defining a perimeter approximating a two-dimensional projection of the surface of a three-dimensional sphere; and an array of sense elements can be patterned across the flexible substrate within the bounds of this two-dimensional projection of the surface of the three-dimensional sphere. In this example, the housing 102 can define an approximately spherical, rigid structure, and the substrate can be folded around and fixed to the housing 102. In this example, gaps between the housing 102 and the back side of the substrate can be potted, such as with an epoxy or urethane, to rigidly mount the substrate to the housing 102. A flexible resistive layer and cover layer can then be wrapped over the substrate to complete the touch sensor. Similarly, the flexible resistive layer can be wrapped over and fixed to the substrate, and the cover layer can be overmolded (e.g., in silicone) or adhered over the flexible resistive layer and substrate to form a substantially continuous spherical surface. Alternatively, the resistive layer and the substrate can be assembled prior to installation of the touch sensor over the housing 102, as described above.

In this implementation, the housing 102 can also include two hollow, hemispherical sections, and the input device 101 can include two discrete touch sensors, such as: one touch sensor installed over one of the hemispherical sections and defining a first touch sensor surface; and a second touch sensor installed over the other hemispherical section and defining a second touch sensor surface. The controller 130, the transmitter 150, a battery 160, and/or other communication, control, processing, or power elements can then be installed in one or both of the hemispherical sections, and the hemispherical sections can be assembled to form one spherical input device.

However, the input device 101 can define any other form and can include any other number of touch sensors defining one or more discrete touch sensor surfaces across the input device 101.

3.8 Overlays

Figure 10:
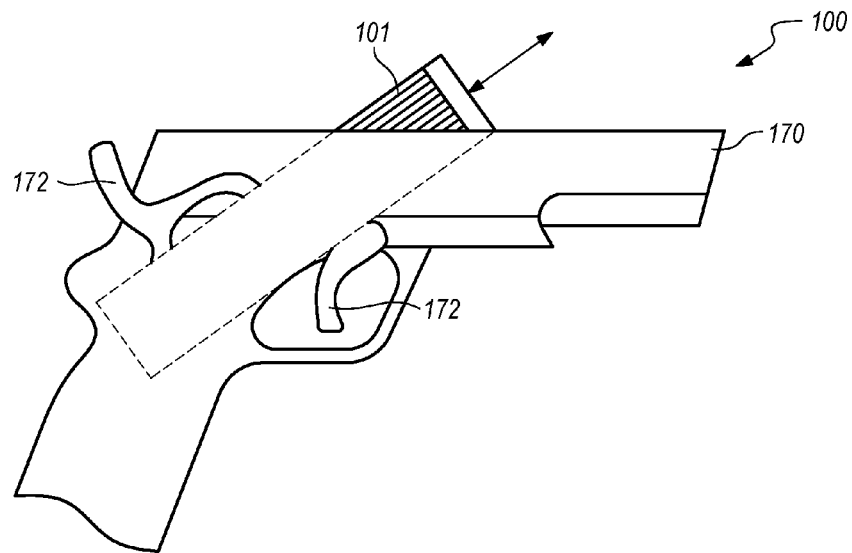
FIG. 10 is a schematic representation of one variation of the system.

One variation of the system 100 further includes a sleeve 170 or "overlay" defining a receptacle configured to transiently receive the input device 101, defining an external surface beyond the receptacle, and configured to communicate a force on its external surface into the touch sensor surface(s) of the input when the input device 101 is installed in the receptacle, as shown in FIGS. 8 and 10. Generally, in this variation, the system 100 can define a kit, including the input device 101 and one or more overlays that can be installed over the input device 101 to modify an effective form factor of the input device 101. However, each overlay can be of or include a flexible material that communicates forces applied to the exterior surface(s) of the overlay into the touch sensor surface(s) of the input device 101, thereby enabling the touch sensor(s) in the input device 101 to detect inputs applied to the exterior surface(s) of the overlay and to represent these inputs in touch images despite a physical offset between the touch sensor surface(s) of the input device 101 and the exterior surface(s) of the overlay. For example, an overlay can include a flexible silicone, urethane, foam (e.g., silicone foam, latex foam), or textile (e.g., leather) body defining a receptacle into which a rectilinear, cylindrical, or spherical, input device can be inserted. The system 100 can thus define a kit including an input device and a set of sleeves or overlays, wherein the input device 101 can be operated by a user independently of a sleeve or can be inserted into any one of various sleeves in the kit to alter the form of the input device 101, such as to match the form of the input device 101 to a virtual tool shown within a virtual environment as the user plays a virtual reality game.

In one example, the system 100 includes a sleeve defining a handed ergonomic overlay including a molded foam body forming an internal receptacle for the input device 101 and a curvilinear exterior grip surface configured to mate with a human's right (or left) hand, as shown in FIG. 8. In another example, the system 100 includes a sleeve defining a handgun overlay including a body molded in a low-durometer silicone into the form of a handgun with grip, receiver, hammer, and trigger, trigger guard, and barrel and forming an internal receptacle for the input device 101 extending from proximal the barrel, through the receiver, near the trigger, and to the grip, as shown in FIG. 10. In this example, the handgun overlay can communicate a force applied to the surface near the hammer into one side of the input device 101; the input device 101 can represent this force in a touch image and transmit this touch image to the computer system; and the computer system can map the location of this input represented in the touch image to a virtual hammer on a virtual handgun and cock the virtual hammer (or release the virtual hammer depending on a direction of the input over a sequence of touch images) if the force magnitude of this input exceeds a threshold hammer cocking force magnitude. In this example, the handgun overlay can also communicate a force applied to the surface near the trigger into the opposite side of the input device 101; the input device 101 can represent this force in a second touch image and transmit this second touch image to the computer system; and the computer system can map the location of this input represented in the second touch image to a virtual trigger on the virtual handgun and pull the virtual trigger of the virtual gun in the virtual environment if the force magnitude of this input exceeds a threshold trigger pull force magnitude. In this example, a sleeve can therefore define a form of a physical tool representing a virtual tool shown within a virtual environment.

In yet another example, the system 100 includes a sleeve defining a handheld gaming controller overlay including a flexible foam body with rigid (e.g., urethane) inserts 172, as described below, defining false button areas (described below), a D-pad, and a joystick over top and front surfaces of the handheld gaming controller overlay. When each of the false button areas is depressed, the D-pad pivoted, or the joystick manipulated by a user when the input device 101 is installed in the handheld gaming controller overlay, the corresponding rigid inserts 172 can move within the flexible foam body and transfer forces applied thereto onto corresponding regions of the touch sensor surface(s) of the input device 101. The input device 101 can represent such forces applied to the rigid elements in touch images; and the computer system can map locations of these inputs represented in these touch images to commands associated with each of these false button areas, D-pad direction, and joystick positions and execute these commands accordingly within the virtual environment substantially in real-time.

However, the system 100 can include one or more sleeves defining any other form and of any other material.

As described above, the exterior surface of the sleeve 170 can also define a false button area 190, such as cylindrical emboss or deboss tactilely representative of a physical button, as shown in FIG. 8. Thus when the input device 101 is installed in the sleeve 170 and a false button area on the sleeve 170 is depressed by a user's finger, the body of the sleeve 170 can transfer the force of this input into the touch sensor of the input device 101 in a direction substantially normal to the touch sensor surface, and the input device 101 can generate a touch image representing the force magnitude and location of this input. Upon receipt of this touch image from the input device 101, the computer system can map the location of the input represented in the touch image to a command associated with the false button area and execute this command if the force magnitude of the input represented in the touch image exceeds a threshold force magnitude characteristic of a physical button (e.g., a physical snap button). For example, the input device 101 can include an alignment feature (e.g., a tab or a magnet), and the sleeve 170 can define an alignment receiver (e.g., a groove or a ferrous element) configured to mate with the alignment feature of the input device 101, thereby constraining the input device 101 to a particular orientation within the sleeve 170 when installed in the receptacle of the sleeve 170. In this example, the computer system can implement a virtual map of false button areas on the sleeve 170 to match an input represented in a touch image to a command associated with such false button areas.

In another example, the sleeve 170 can include one or more ridges, knobs, or other substantially rigid features that extend into the receptacle to contact and depress the touch sensor surface of the input device 101 when the input device 101 is installed in the receptacle. The controller can represent forces applied to the touch sensor surface by these features in a touch image; and the computer system can identify values in the touch image representing these features; determine an orientation of the input device 101 within the sleeve 170, and locate a virtual map of false button areas on the sleeve 170 to the touch image (and subsequent touch images) received from the input device 101 accordingly. In this example, the sleeve 170 can include a substantially unique array of such features, and the computer system can also identify the type of sleeve containing the input device 101 based on the array of forces applied by these features represented in a touch image received from the input device 101. Similarly, as in the foregoing example, the sleeve 170 can include one or more magnets that function as alignment features; the input device 101 can include ferrous element and magnetic field (e.g., Hall-effect) sensor pairs that magnetically couple to and that detect proximity to these magnetic elements, respectively; and the input device 101 or the computer system can identify the sleeve 170 in which the input device 101 is installed based on a presence of magnetic fields detected by each magnetic field sensor in the input device 101. Alternatively, the sleeve 170 can include an RFID tag that wirelessly broadcasts an identifier (e.g., a UUID), an ID chip that outputs an identifier over wired communication protocol, or any other wired or wireless ID mechanism; the input device 101 can collect an identifier from the sleeve 170 and pass this to the computer system; and the computer system can identify the sleeve 170 and then implement a corresponding virtual map of false button areas on the sleeve 170 and corresponding commands and threshold force magnitudes based on an identifier received from the sleeve 170. Yet alternatively, the computer system can prompt the user to manually identify whether the input device 101 has been installed in the sleeve 170 and/or which of various available sleeves is currently in use.

As described above, a sleeve can also include: a rigid insert 172 of a first durometer; and a flexible substrate of a second durometer less than the first durometer, interposed between the receptacle and the rigid insert 172, configured to deform in response to application of a force on the rigid insert 172 toward the receptacle, and configured to communicate a force applied to the rigid insert 172 into the first touch sensor surface, as shown in FIG. 10. Generally, the sleeve 170 can include elements of different rigidity (e.g., durometer) that cooperate to deform and to communicate forces on the surface of the sleeve 170 into a touch sensor surface of the input device 101. For example, a sleeve can include only a moderately flexible material (e.g., a medium-durometer silicone) in volumes of the sleeve 170—between the exterior surface of the sleeve 170 and a touch sensor surface on the input device 101—less than five millimeters in thickness. In this example, the sleeve 170 can also include a moderately flexible material (e.g., a medium-durometer solid silicone) over a more flexible material (e.g., a low-durometer silicone foam) in volumes of the sleeve 170—between the exterior surface of the sleeve 170 and a touch sensor surface on the input device 101—between five millimeters and ten millimeters in thickness. However, for volumes of the sleeve 170—between areas of interest on the surface of the sleeve 170 (e.g., a false button area, a false trigger for a handgun overlay, a false D-pad, a false joystick, etc.) and a nearest area on the touch sensor surface of the input device 101—exceeding ten millimeters, the sleeve 170 can include a rigid insert 172 (e.g., a high-durometer silicone beam or pillar) extending from the area of interest on the surface of the sleeve 170 to the interior surface of the receptacle for the input device 101. Alternatively, in this implementation, the sleeve 170 can include a rigid insert 172 extending from the area of interest on the surface of the sleeve 170 to a depth offset from the receptacle (e.g., by a distance of two millimeters) and a flexible volume (e.g., an expanded silicone foam insert) between the end of the rigid insert 172 and the receptacle for the input device 101.

For example, a handheld gun overlay can include a rigid trigger suspended from a flexible member or living hinge, as shown in FIG. 10. In another example, a handheld gaming controller overlay can include a rigid false button, a rigid D-pad insert, and a rigid joystick insert suspended from the body of the overlay with a soft silicone member. When depressed or manipulated by a user holding the sleeve 170 and input device assembly, the rigid insert 172 can communicate an applied force into the adjacent touch sensor of the input device 101, and the input device 101 can represent this applied force in a touch image. However, a sleeve can include any other rigid or flexible sections, volumes, or elements that cooperate to communicate forces on the surface of the sleeve 170 into one or more touch sensors of the input device 101.

A sleeve can further include passive optical fiducials or windows that align with active optical fiducials arranged on the input device 101 in order to enable an external system to track the position of the input device 101 and sleeve assembly in real space when in use.

3.9 Strap

One variation of the input device 101 further includes a strap 180 extending from the housing 102 and configured to couple the housing 102 to a user's hand. For example, the input device 101 can include a soft strap configured to wrap around a user's wrist, as shown in FIG. 8. In another example, the strap 180 includes a rigid member that engages a user's forearm and/or palm and functions to constrain the input device 101 (and installed sleeve) proximal the user's palm, as shown in FIG. 9. When worn, the strap 180 can thus enable a user to release the input device 101 with his hand without dropping the input device 101; the computer system thus interprets withdrawal of all inputs on touch sensor(s) as release of the input device 101 and updates a virtual object or virtual tool within the virtual environment accordingly. With the strap 180 holding the input device 101 at the user's fingertips, the user can then later close his hand around the input device 101, such as to grasp a virtual object or virtual tool within the virtual environment.

4. Integrated Device

In one variation, the first method S100 and/or the second S200 are executed by a singular (e.g., unitary) device including a computer system, a digital display, a transparent (or translucent) touch sensor surface arranged over the digital display. For example, the device can include a pressure-sensitive touch sensor-enabled tablet. In this variation, the device can execute Blocks of the method: to track its own position and orientation (and therefore the position and orientation of the touch sensor surface); to record magnitudes and locations of forces on the touch sensor surface; to generate digital frames of a virtual environment including a virtual surface of a virtual object manipulated according to the position and orientation of the computing device and the location and magnitude of a force on the touch sensor surface; and to render these digital frames on the integrated digital display substantially in real-time. In a similar variation, the method is executed by a singular device including a computer system, a touch sensor surface, and a digital display arranged over the touch sensor surface. However, Blocks of the method can be executed by any other device or combination of devices.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for manipulating virtual objects within a virtual environment comprising:
   at a first time, determining a first position of a touch sensor within a real space, the touch sensor comprising a touch sensor surface;
   based on the first position of the touch sensor within the real space at the first time, bounding a virtual surface of a virtual object within the virtual environment tractable through inputs across an area of the touch sensor surface;
   generating a first force vector comprising a magnitude related to a force magnitude of a first input on the touch sensor surface and a direction related to an orientation of the touch sensor within the real space at the first time; and
   manipulating the virtual surface of the virtual object within the virtual environment according to the first force vector.

2. The method of claim 1, further comprising locating an origin of the first force vector within the virtual environment based on a first location of the first input on the touch sensor surface and the first position of the touch sensor within the real space.

3. The method of claim 1, further comprising serving a sequence of digital frames representing manipulation of the virtual surface of the virtual object within the virtual environment to a virtual reality headset.

4. The method of claim 1, wherein manipulating the virtual surface within the virtual environment comprises:
   virtually coupling a virtual tool, representing a handheld device comprising the touch sensor, to a subregion of the virtual surface within the virtual environment;
   orienting an axis of the virtual tool to the direction of the first force vector within the virtual environment; and
   coupling the virtual tool to the virtual object according to the magnitude of the first force vector.

5. The method of claim 4:
   wherein coupling the virtual tool to the virtual object comprises depressing the virtual tool into the virtual surface to a depth related to the magnitude of the first force vector; and
   further comprising:
      at a second time succeeding the first time, determining a second position of the touch sensor within the real space;
      generating a second force vector comprising a magnitude related to a force magnitude of the first input moved to a second location on the touch sensor surface and a direction related to an orientation of the touch sensor within the real space at the second time;
      projecting the second location of the first input on the touch sensor surface onto a second subregion of the virtual surface;
      orienting the axis of the virtual tool to the direction of the second force vector;
      drawing the virtual tool across a length of the virtual surface related to a distance between the first location and the second location; and
      deforming the virtual object over the length of the virtual surface according to the magnitude of the second force vector.

6. The method of claim 1, wherein bounding the virtual surface of the virtual object comprises:
   projecting a reference boundary corresponding to a planar area of the touch sensor surface onto the virtual surface of a three-dimensional virtual object according to the position and the orientation of the touch sensor within the real space;
   controlling the virtual surface bounded by a projection of the reference boundary on the virtual object through manipulation of the touch sensor and through inputs across the touch sensor surface;
   in response to movement of the touch sensor in a first direction relative to a user within the real space, increasing a scale of the reference boundary; and
   in response to movement of the touch sensor in a second direction opposite the first direction within the real space, decreasing a scale of the reference boundary.

7. The method of claim 1:
   further comprising projecting the first force vector onto a point on the virtual surface of the virtual object; and
   wherein manipulating the virtual surface within the virtual environment comprises moving the virtual object in three dimensions within the virtual environment according to the magnitude of the first force vector acting on the point on the virtual surface in the direction of the first force vector.

8. The method of claim 1, wherein determining the first position of the touch sensor within the real space at the first time comprises, at the first time:
   scanning the real space for a handheld device comprising the touch sensor surface and an array of sense elements arranged under the touch sensor surface; and
   querying the handheld device for a lateral position, a longitudinal position, and a force magnitude of each discrete input area on the touch sensor surface at substantially the first time, the force magnitude of each discrete input area within a spectrum of force magnitudes sensible by the array of sense elements.

9. The method of claim 8:
   wherein generating the first force vector comprises writing a virtual magnitude related to a peak force magnitude on the touch sensor surface at substantially the first time to the first force vector; and
   wherein manipulating the virtual surface of the virtual object comprises modifying a surface geometry of the virtual surface proximal the first force vector based on the virtual magnitude of the first force vector.

10. The method of claim 1, further comprising:
    at the touch sensor, detecting the first input at the first location on the touch sensor surface at substantially the first time;
    at the touch sensor, detecting a second input at a second location offset from the first input on the touch sensor surface at substantially the first time;
    locating a virtual tool within the virtual environment proximal the virtual object based on the first position of the touch sensor;
    positioning two virtual elements contiguous with the virtual tool onto opposing sides of the virtual object based on the first location of the first input, the second location of the second input on the touch sensor surface, and the direction of the first force vector; and
    coupling the virtual object to the virtual tool via the two virtual elements according to the magnitude of the first force vector.

11. The method of claim 10:
    wherein locating the virtual tool within the virtual environment comprises locating a virtual hand comprising a virtual thumb and a virtual forefinger at a location proximal the virtual object within the virtual environment according to the first position of the touch sensor surface;

wherein positioning two virtual elements on opposing sides of the virtual object comprises aligning the virtual thumb element to the direction and an origin of the first force vector, locating the virtual thumb on a first side of the virtual object, and locating the virtual forefinger on an opposing side of the virtual object within the virtual environment; and wherein coupling the virtual object to the virtual tool via the two virtual elements comprises virtually grasping the virtual object between the virtual thumb and virtual forefinger with a virtual grasping force related to the force magnitude of the first input.

12. A method for manipulating virtual objects within a virtual environment comprising:

tracking an orientation of a touch sensor surface within a real space;

orienting a virtual object globally within the virtual environment based on the orientation of the touch sensor surface in the real space;

receiving a touch image defining a magnitude and a position of a force input on the touch sensor surface;

rotating the virtual object locally about a first axis within the virtual environment based on the position of the force input on the touch sensor surface; and rotating the virtual object locally about a second axis within the virtual environment based on the magnitude of the force input on the touch sensor surface, the second axis perpendicular to the first axis.

13. The method of claim 12, further comprising translating the virtual object locally along a third axis within the virtual environment according to the trajectory of the input moving across the touch sensor surface, the third axis perpendicular to the first axis and the second axis and related to a height of the touch sensor surface.

14. The method of claim 12, wherein tracking the orientation of the touch sensor comprises:

scanning the real space for a device comprising the touch sensor surface and an array of sense elements arranged under the touch sensor surface; and querying the device for a lateral position, a longitudinal position, and a force magnitude of a discrete input area on the touch sensor surface, the force magnitude of the discrete input area within a spectrum of force magnitudes sensible by the array of sense elements.

15. The method of claim 12, wherein rotating the virtual object locally about the second axis within the virtual environment comprises rotating the virtual object by a first offset in a first direction in the virtual environment in response to the magnitude of the force input exceeding a threshold force magnitude, the first offset proportional to a difference between the force magnitude and the threshold force magnitude.

16. The method of claim 12:

wherein orienting the virtual object globally within the virtual environment based on the orientation of the touch sensor surface in the real space comprises locating the virtual object within the virtual environment according to changes in the orientation of the touch sensor within the real space; and wherein rotating the virtual object locally about the first axis within the virtual environment based on the position of the force input on the touch sensor surface comprises locally deforming a surface of the virtual object at a location corresponding to the position of the force input on the touch sensor surface.

17. A method for manipulating a virtual environment comprising, at a first time:

mapping a touch sensor surface to a virtual surface in a virtual environment;

receiving a touch image defining a magnitude and a position of a first force input on the touch sensor surface;

defining a direction of a first vector based on the position of the first force input;

defining a magnitude of the first vector based on the magnitude of the first force input; and manipulating the virtual surface within the virtual environment according to the magnitude and the direction of first vector.

18. The method of claim 17, wherein manipulating the virtual surface according to the first vector within the virtual environment comprises modifying a surface geometry the virtual surface in three dimensions within the virtual environment according to the magnitude of the first vector acting on a point on the virtual surface in the direction of the first vector.

19. The method of claim 17:

wherein mapping the touch sensor surface to the virtual surface in the virtual environment comprises bounding the virtual surface of a virtual object within the virtual environment tractable through inputs across an area of the touch sensor surface; and wherein manipulating the virtual surface within the virtual environment according to the magnitude and the direction of first vector comprises translating the virtual object in the virtual environment in three dimensions within the virtual environment according to the magnitude of the first vector acting on a point on the virtual surface in the direction of the first vector.

20. The method of claim 17:

wherein mapping the touch sensor surface to the virtual surface in the virtual environment comprises scanning a real space for a device comprising the touch sensor surface and an array of sense elements arranged under the touch sensor surface;

wherein receiving the touch image comprises receiving, from the device, a lateral position, a longitudinal position, and the magnitude of a discrete input area on the touch sensor surface, the magnitude of the discrete input area within a spectrum of force magnitudes sensible by the array of sense elements; and wherein manipulating the virtual surface within the virtual environment comprises translating the virtual surface in the virtual environment by a distance proportional to the magnitude of the first vector in the direction of the first vector.

* * * * *